United States Patent
Kim et al.

(10) Patent No.: US 9,678,611 B2
(45) Date of Patent: Jun. 13, 2017

(54) TOUCH SENSING SYSTEM AND DISPLAY APPARATUS

(71) Applicant: LG DISPLAY CO., LTD., Seoul (KR)

(72) Inventors: YoungGyu Kim, Paju-si (KR);
ByoungGwan Lee, Paju-si (KR);
Yoonnara Jang, Buan-gun (KR);
Kyounghwan Kim, Paju-si (KR); Sujin Kwon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/461,145

(22) Filed: Aug. 15, 2014

(65) Prior Publication Data

US 2015/0123939 A1    May 7, 2015

(30) Foreign Application Priority Data

Nov. 5, 2013    (KR) ........................ 10-2013-0133404

(51) Int. Cl.
*G06F 3/044*        (2006.01)
*G06F 3/041*        (2006.01)

(52) U.S. Cl.
CPC ............ *G06F 3/044* (2013.01); *G06F 3/0416* (2013.01)

(58) Field of Classification Search
USPC ......................................................... 345/174
See application file for complete search history.

(56) References Cited

U.S. PATENT DOCUMENTS

| | | | |
|---|---|---|---|
| 2008/0042992 A1* | 2/2008 | Kim ...................... | G06F 3/0416 345/173 |
| 2008/0165154 A1* | 7/2008 | Kim ...................... | G06F 3/0488 345/173 |
| 2008/0218489 A1* | 9/2008 | Park ....................... | G06F 3/044 345/173 |
| 2009/0250269 A1 | 10/2009 | Hung et al. | |
| 2009/0251437 A1 | 10/2009 | Hung et al. | |
| 2011/0215952 A1* | 9/2011 | Aria et al. ........................ | 341/20 |
| 2011/0242015 A1* | 10/2011 | Lou ............................... | 345/173 |
| 2012/0056851 A1* | 3/2012 | Chen ..................... | G06F 3/0418 345/174 |
| 2013/0141363 A1* | 6/2013 | Hung .................... | G06F 3/0488 345/173 |
| 2013/0278525 A1* | 10/2013 | Lim et al. ...................... | 345/173 |
| 2014/0176573 A1* | 6/2014 | Vembu ..................... | G06T 1/20 345/502 |
| 2015/0035794 A1* | 2/2015 | Zhitomirskiy ................ | 345/174 |

FOREIGN PATENT DOCUMENTS

| | | |
|---|---|---|
| CN | 102207781 A | 10/2011 |
| CN | 102402316 A | 4/2012 |
| CN | 102999471 A | 3/2013 |
| JP | 2008-47125 A | 2/2008 |
| JP | 2013-20479 A | 1/2013 |

* cited by examiner

*Primary Examiner* — Carolyn R Edwards
*Assistant Examiner* — Deeprose Subedi
(74) *Attorney, Agent, or Firm* — Birch, Stewart, Kolasch & Birch, LLP

(57) ABSTRACT

The present disclosure is related to a touch sensing system and a display apparatus decreasing a sensing time and enabling an effective touch sensing, although a number of sensing electrodes increases according to an increase of an area of a touch panel.

12 Claims, 13 Drawing Sheets

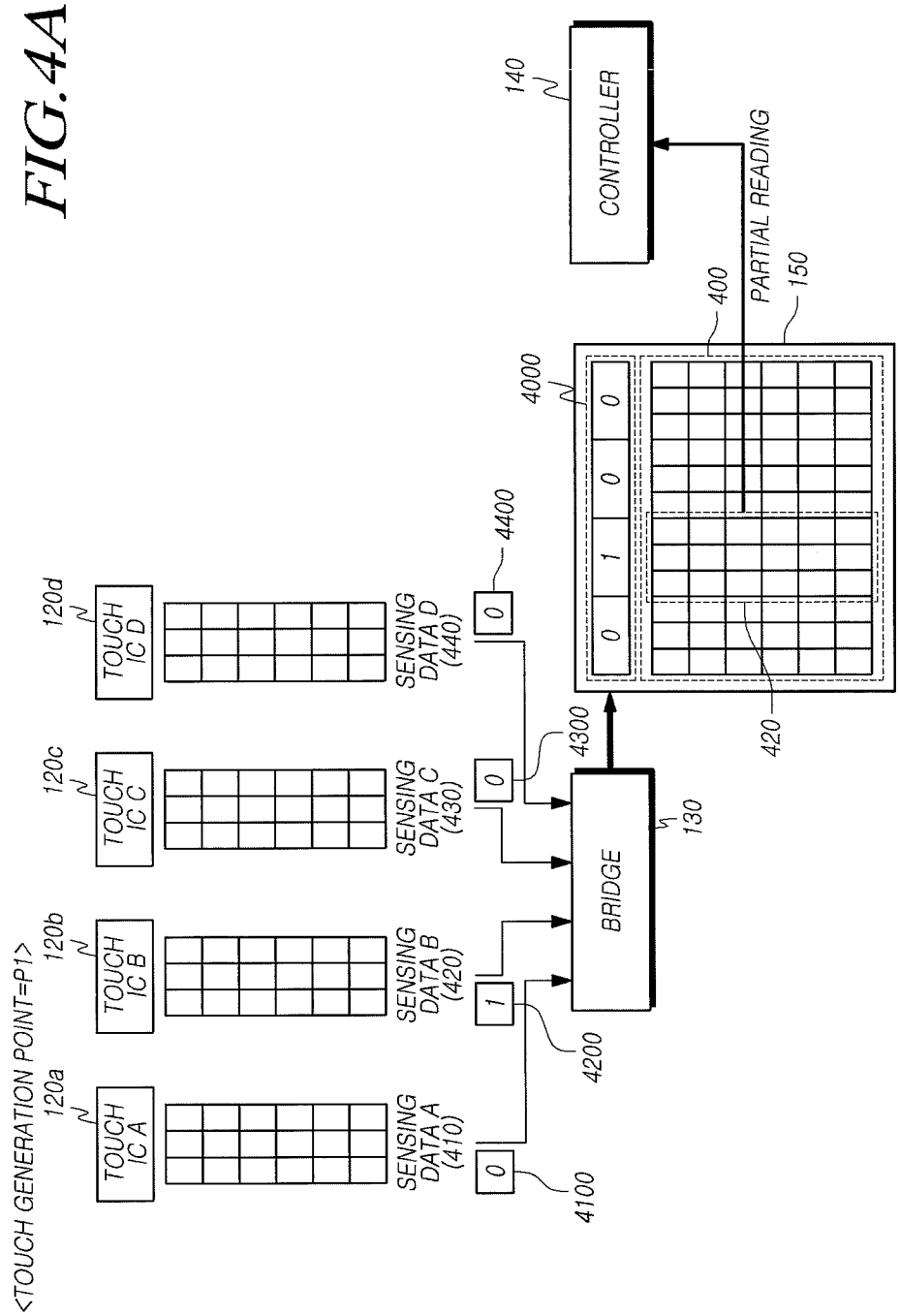

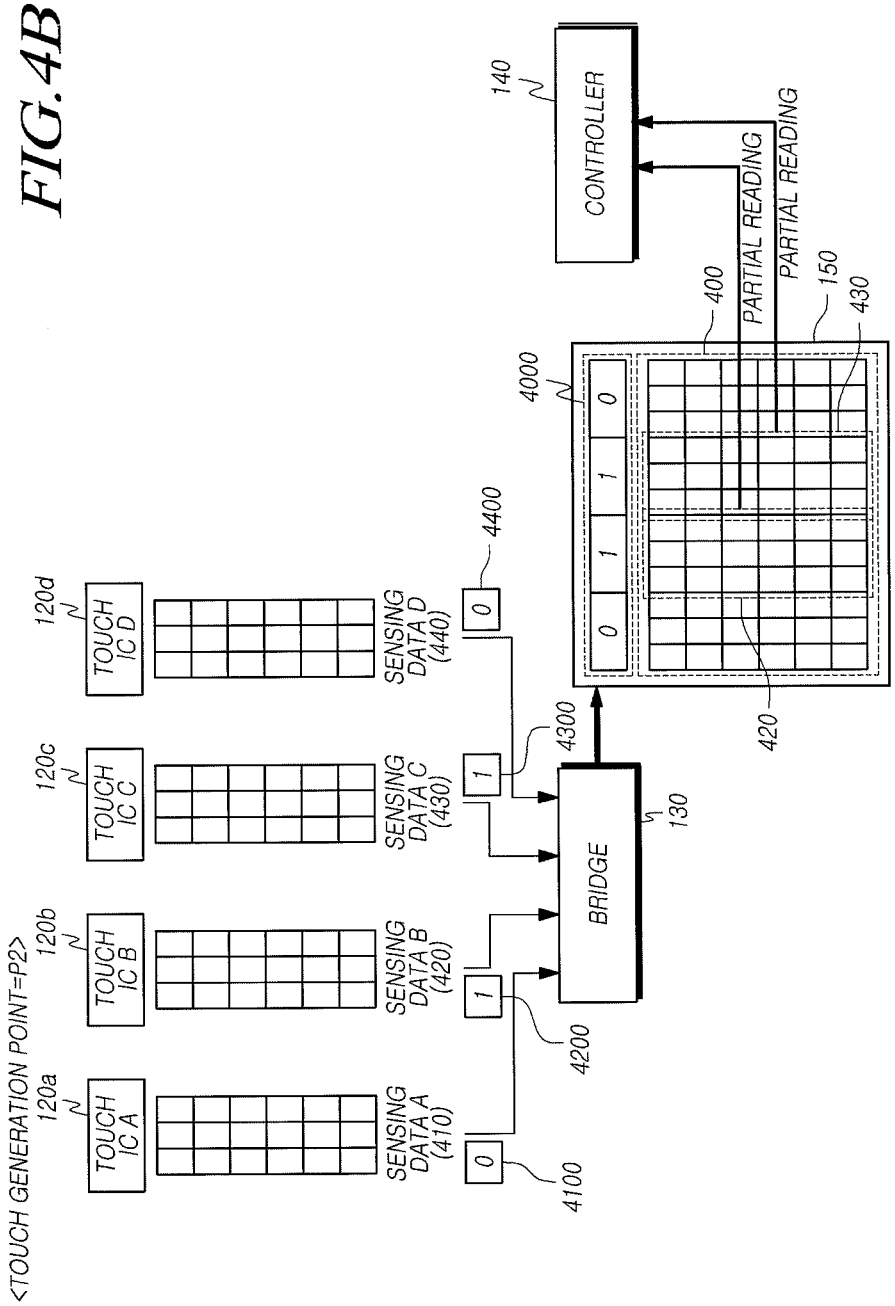

TOUCH SENSING SYSTEM AND DISPLAY APPARATUS

CROSS-REFERENCE TO RELATED APPLICATION

This application claims priority from and the benefit under 35 U.S.C. §119(a) of Korean Patent Application No. 10-2013-0133404, filed on Nov. 5, 2013, which is hereby incorporated by reference for all purposes as if fully set forth herein.

BACKGROUND OF THE INVENTION

1. Field of the Invention

The present invention relates to a touch sensing system and a display apparatus.

2. Description of the Related Art

With the development of information society, various types of requirements for a display apparatus for displaying an image are increasing, and recently, various display apparatuses, such as a Liquid Crystal Display (LCD) apparatus, a Plasma Display Panel (PDP), and an Organic Light Emitting Diode (OLED) display apparatus, are being used.

The display apparatus provides an input method based on a touch that enables a user to input information or an instruction easily, directly and conveniently, getting away from the usual input methods, such as pushing a button, a keyboard, a mouse, etc. For the input method based on the touch, a touch panel should be included in the display apparatus.

Because the display apparatus is becoming larger, an area of the touch panel is becoming larger. As described above, because the display apparatus is becoming larger, numbers of the driving electrodes and sensing electrodes which should be formed on the touch panel for a touch sensing increase.

When the number of sensing electrodes increases, a sensing time increases and an effective touch sensing is difficult.

SUMMARY OF THE INVENTION

An aspect of the present invention is to provide a touch sensing system and a display apparatus decreasing a sensing time and enabling an effective touch sensing, although a number of sensing electrodes increases according to an increase of an area of a touch panel.

In accordance with an aspect of the present invention, there is provided a touch sensing system including: a touch panel including driving electrodes and sensing electrodes defining sensor nodes; two or more touch integrated circuits that sense sensing information of each of the corresponding sensor nodes from connected sensing electrodes among the sensing electrodes by sequentially driving the driving electrodes, and transmit sensing data including the sensed sensing information of each of the corresponding sensor nodes; a bridge that aligns the sensing data transmitted from each of the two or more touch integrated circuits based on a sensor node position, and transmits the sensing data; and a controller that detects a touch coordinate based on a whole or a portion of the sensing data transmitted from the bridge.

In accordance with another aspect of the present invention, there is provided a display apparatus including: a touch panel including driving electrodes and sensing electrodes defining sensor nodes; and a printed circuit board attached to one side of the touch panel, and including two or more touch integrated circuits sensing the sensor nodes and transmitting sensing data, a bridge aligning the sensing data transmitted from each of the two or more touch integrated circuits and transmitting the sensing data, and a controller detecting a touch coordinate based on a whole or a portion of the sensing data transmitted from the bridge.

In accordance with another aspect of the present invention, there is provided a touch sensing system including: a touch panel including driving electrodes and sensing electrodes defining sensor nodes; two or more touch integrated circuits that sense sensing information of each of the corresponding sensor nodes from connected sensing electrodes among the sensing electrodes by sequentially driving the driving electrodes, transmit sensing data including the sensed sensing information of each of the corresponding sensor nodes, and transmit touch generation or non-generation information determined in each of the sensor nodes defined by the connected sensing electrodes or a touch integrated circuit tag corresponding to the touch generation or non-generation information; and a controller that detects a touch coordinate based on only a portion of the sensing data among a whole of the sensing data transmitted from each of the two or more touch integrated circuits and based on the touch generation or non-generation information or the touch integrated circuit tags respectively corresponding to the two or more touch integrated circuits.

As described above, according to the present invention, there is an effect of providing the touch sensing system and the display apparatus capable which decrease a sensing time and enable an effective touch sensing, although a number of the sensing electrodes increases according to an increase of an area of a touch panel.

In addition, according to the present invention, there is an effect of providing the touch sensing system and the display apparatus performing an effective sensing process through a reception (Rx) division sensing method partitively sensing sensing electrodes, when the number of the sensing electrodes increases according to the increase of the area of the touch panel.

With relation to the Rx division sensing method, the bridge, as an additional configuration receiving divided and sensed sensing data from the two or more touch integrated circuits (ICs) in parallel, assigning and combining the received sensing data, among the two or more touch ICs and the controller performing the touch algorithm is further disclosed. Therefore, delays of the sensing data transmission and the touch algorithm performance, rather may be generated by the Rx division sensing method suggested for increasing the effectiveness of the touch sensing when the number of the sensing electrodes increases according to the increase of the area of the touch panel, decrease. Thus, there is an effect of enabling high speed sensing data transmission and touch algorithm performance.

In addition, because of the bridge configuration suggested for the high speed data transmission and touch algorithm, an input/output (I/O) collision may be generated according to memory uses of each of the controller and the bridge. In addition, because the number of the sensing electrodes increases due to the increase of the area of the touch panel, a sensing data amount stored in the memory and read from the memory increases. Thus, according to the present invention, there is an effect of providing a structure of a shared memory and a method for controlling the shared memory that enables the bridge and the controller to effectively read, write and so on, the sensing data with respect to many sensor nodes without a memory I/O collision.

In addition, according to the present invention, a touch coordinate is detected with respect to only a partial area where it is determined that a touch is generated, not a whole area on a touch panel. To this end, only a necessary sensing data is read partially, therefore there is an effect of decreasing the amount of the sensing data which should be read by the controller and enabling the controller to process the touch algorithm faster.

BRIEF DESCRIPTION OF THE DRAWINGS

The above and other objects, features and advantages of the present invention will be more apparent from the following detailed description taken in conjunction with the accompanying drawings, in which:

FIGS. 4A and 4B are views illustrating a sensing data process of the touch sensing system according to an embodiment of the present invention;

DETAILED DESCRIPTION OF THE EMBODIMENTS

Figure 1:
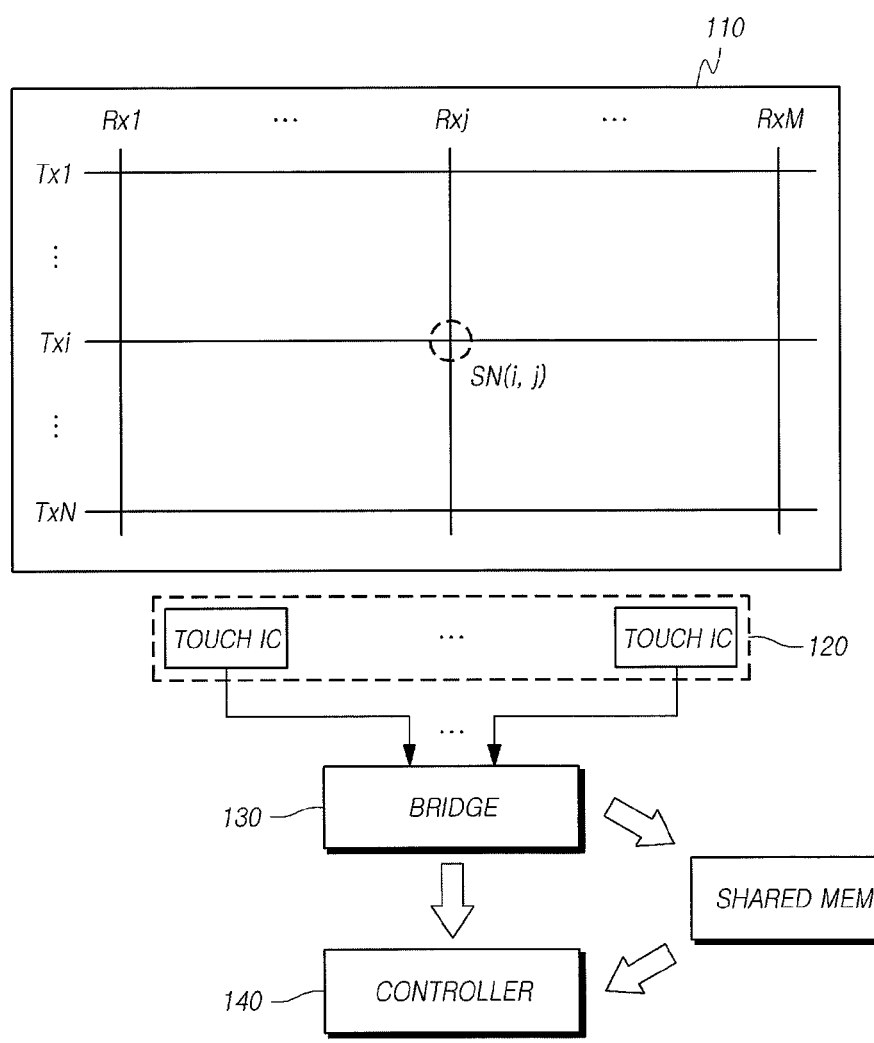
FIG. 1 is a view schematically illustrating a touch sensing system according to an embodiment of the present invention.

Hereinafter, embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a view schematically illustrating a touch sensing system 100 according to an exemplary embodiment. All the components of the touch sensing system, according to all the embodiments of the present invention, are operatively coupled and configured.

Referring to FIG. 1, the touch sensing system 100 according to an exemplary embodiment includes a touch panel 110 including N number of driving electrodes Tx1 to TxN and M number of sensing electrodes Rx1 to RxM, two or more touch Integrated Circuits (ICs) 120 for a reception (Rx) division sensing, a bridge 130 aligning and combining sensing data generated from each of the two or more touch ICs 120 through a sensing a sensor node, a controller 140 detecting a touch coordinate based on the whole or a portion of the sensing data aligned and combined in the bridge 130, etc.

In the touch panel 110, the N number of driving electrodes Tx1 to TxN and the M number of sensing electrodes Rx1 to RxM are formed, and thus (N*M) number of sensor nodes SN(1,1) to SN(1,M), SN(2,1) to SN(2,M), . . . , SN(N,M) are defined. Here, the SN(i,j) is a sensor node defined by an ith driving electrode Txi and a jth sensing electrode Rxj (here, $1 \leq i \leq N$, $1 \leq j \leq M$, N is a number of the driving electrode, and M is a number of the sensing electrode).

The two or more touch ICs 120 performs the Rx division sensing, and thus the two or more touch ICs 120 divide the whole sensor node by a certain number to sense the whole sensor node.

Thus, each of the two or more touch ICs 120 senses sensing information (e.g., a capacitance) of each of the sensor nodes from connected sensing electrodes among the M number of sensing electrodes (Rx1 to RxM) by sequentially driving the N number of driving electrodes (Tx1 to TxN).

In addition, each of the two or more touch ICs 120 may transmit sensing data including the sensing information sensed in each of the sensor nodes managed by the touch IC 120.

Each of the two or more touch ICs 120 may determine a touch generation or non-generation in an area formed by the sensor nodes defined by sensing electrodes connected to each of the two or more touch ICs 120 among the whole area of the touch panel 110, based on a charge amount change ($\Delta Q$) or a voltage change ($\Delta V$) informing the charge amount change ($\Delta Q$) in each of the sensor nodes defined by the sensing electrodes connected to each of the two or more touch ICs 120. Here, when the charge amount change ($\Delta Q$) or the voltage change ($\Delta V$) informing the charge amount change ($\Delta Q$) in each of the sensor nodes is larger than a charge amount change critical value ($\Delta Q\_th$) or a voltage change critical value ($\Delta V\_th$), each of the two or more touch ICs 120 may determine that a touch is generated.

Each of two or more touch ICs 120 may transmit touch generation or non-generation information in the area formed by the sensor nodes managed by the touch IC 120 along with the sensing data including the sensing information of each of the sensor nodes managed by the touch IC 120.

Next, the bridge 130 aligns and combines the sensing data transmitted from each of the two or more touch ICs 120, based on a sensor node position. Here, each of the N number of driving electrodes Tx1 to TxN and each of the M number of sensing electrodes Rx1 to RxM correspond, and thus each of the sensor nodes is defined.

In addition, the bridge 130 may collect the touch generation or non-generation information transmitted from each of the two or more touch ICs 120 and provide a touch IC tag instructing a touch generation or instructing a touch non-generation to each of the two or more touch ICs 120, so that the controller 140 may check a position where the touch is generated on the touch panel 110. The whole or the portion of the sensing data generated by aligning and combining the sensing data from each of the two or more touch ICs 120, and the touch IC tag provided by collecting the touch generation or non-generation information of each of the two or more touch ICs 120, may be transferred from the bridge 130 to the controller 140 in a directly transmitted type (i.e., a direct delivery type). Alternatively, the whole or the portion of the sensing data and the touch IC tag transmitted from the bridge 130 may be stored in a shared memory 150 and may be transferred to the controller 140 in a type (store and read type) wherein the controller 140 reads the whole or the portion of the sensing data and the touch IC tag from the shared memory 150.

The controller 140 performs a touch algorithm based on the whole or the portion of the sensing data transmitted from the bridge 130 to detect the touch coordinate.

That is, the controller 140 may directly receive the whole or the portion of the sensing data transferred from the bridge 130 to detect the touch coordinate based on the whole or the portion of the sensing data. Alternatively, the controller 140 may read the whole or the portion of the sensing data transmitted from the bridge 130 and stored in the shared memory 150 to detect the touch coordinate based on the whole or the portion of the sensing data.

Here, performing the touch algorithm by the controller 140 by using the whole of the sensing data transmitted from the bridge 130 means detecting the touch coordinate based on the whole area of the touch panel 110, and performing the touch algorithm by the controller 140 by using the portion of the sensing data transmitted from the bridge 130 means detecting the touch coordinate based on the portion of the area where it is determined that the touch is generated among the whole of the area of the touch panel 110.

In this respect, when the controller 140 performs the touch algorithm by using the portion of the whole of the sensing data transmitted from the bridge 130, data amount read from the shared memory 150 for the touch algorithm performance decreases in correspondence to a difference between the whole and the portion of the sensing data, and touch algorithm performance time may be decrease in correspondence to the decrease of the data amount for the touch algorithm performance.

Meanwhile, each of the two or more touch ICs 120 may transmit the sensing data generated based on the sensed sensing information to the bridge 130 in a serial communication method.

At this time, the sensing data transmission from each of the two or more touch ICs 120 is performed unrelated to a sensing data transmission time point of another touch IC.

Thus, the bridge 130 may simultaneously receive the sensing data transmitted from each of two or more touch ICs 120, in parallel.

That is, although each of the two or more touch ICs 120 transmits the corresponding sensing data to the bridge 130 in the serial communication method, because each of the two or more touch ICs 120 transmits the corresponding sensing data to the bridge 130 unrelated to the sensing data transmission time point of another touch IC 120, the two or more touch ICs 120 simultaneously transmit the sensing data in parallel, and the bridge 130 simultaneously receives the sensing data transmitted from each of the two or more touch ICs 120, in parallel.

In addition, the bridge 130 simultaneously receives the sensing data transmitted from each of the two or more touch ICs 120, in parallel, and aligns and combines the sensing data. In addition, the bridge 130 transmits the aligned and combined sensing data to the controller 140 or stores the aligned and combined sensing data to the shared memory 150 according to a parallel communication method so that the controller 140 may use the sensing data in the touch algorithm.

At this time, when the bridge 130 transmits or stores the sensing data transmitted from the two or more touch ICs 120 and aligned in the bridge 130 to the controller 140 or the shared memory 150, the bridge 130 may transmit or store the touch IC tag to the controller 140 or the shared memory 150.

Thus, in case of the transfer type (the store and read type) according to data storing and reading method between the bridge 130 and the controller 140, the controller 140 reads the whole or the portion of the sensing data transmitted from the bridge 130 and stored in the shared memory 150, detects the touch coordinate based on the read sensing data. When the controller 140 reads the portion among the whole of the sensing data transmitted from the bridge 130 and stored in the shared memory 150, the controller 140 reads only the portion of the sensing data, transmitted from the touch IC 120, connected to the sensing electrodes in the partial area corresponding to the point where the touch is generated among the whole area of the touch panel 110, to the bridge 130 and stored in the shared memory 150, among the whole of the sensing data stored in the shared memory 150, based on the touch IC tag stored in the shared memory 150 in correspondence to each of the two or more touch ICs 120, and performs the touch algorithm to detect the touch coordinate (refer to FIG. 4A).

In case of this method, when the point where the touch is generated is on a boundary between the two areas or is near to an adjacent area in a distance equal to or shorter than a certain distance, a touch coordinate detection error may be generated.

Thus, in order to increase an accuracy of the touch detection, when the point where the touch is generated is on the boundary between the two areas or is near to the adjacent area in the distance equal to or shorter than the certain distance, the controller 140 may read the portion of the sensing data, transmitted from the two touch ICs 120, connected to the sensing electrodes in each of two areas of both sides of the point where the touch is generated among the whole area of the touch panel 110 or the adjacent area adjacent to the point where the touch is generated among the whole area of the touch panel 110, to the bridge 130 and stored in the shared memory 150, among the whole of the sensing data stored in the shared memory 150, based on the touch IC tag stored in the shared memory 150 in correspondence to the two or more touch ICs 120, respectively (refer to FIG. 4B).

Thus, the data amount read from the shared memory 150 by the controller 140 may decrease, and a process speed of the touch algorithm of the controller 140 may be faster.

In addition, in case of the data direct transfer type (direct delivery type) between the bridge 130 and the controller 140, the controller 140 detects the touch coordinate based on the whole or the portion of the sensing data transmitted from the bridge 130. When the controller 140 detects the touch coordinate based on only the portion of the sensing data among the whole of the sensing data transmitted from the bridge 130, the controller 140 performs the touch algorithm based on only the sensing data transmitted to the bridge 130 from the touch IC 120 corresponding to the touch IC tag instructing the touch generation, among the whole of the sensing data transmitted from the bridge 130, based on the touch IC tag transmitted in correspondence to two or more touch ICs 120.

Therefore, a sensing data amount used for the touch algorithm performance by the controller 140 decreases, and thus a process speed of the touch algorithm of the controller 140 may be faster.

In the touch sensing system 100 according to an exemplary embodiment described above, the sensing data is not directly transferred to the controller 140 from each of the two or more touch ICs 120, but rather, the bridge 130 relays the sensing data between the two or more touch ICs 120 and the controller 140 by aligning and combining the sensing data. Thus, the sensing data from each of the two or more touch ICs 120 may not be sequentially transmitted to the controller 140, and the two or more touch ICs 120 may simultaneously transmit the sensing data to the controller 140 in parallel.

Therefore, the time point when the sensing data is transmitted from all of the two or more touch ICs 120 is considerably faster, and the controller 140 capable of performing the touch algorithm after all of the two or more touch ICs 120 transmit the sensing data may perform the touch algorithm at a much faster time point. Such a merit may be further obvious in a case wherein a number of the touch ICs increases because a size of the touch panel 110 increases and so on.

In addition, when the touch sensing system 100 according to an exemplary embodiment is used, each of the two or more touch ICs 120 determines whether the touch is generated or not on the areas of the touch panel 110 managed by the respective touch ICs 120, and informs the determination result (i.e., the touch generation or non-generation determination information). Therefore, the controller 140 detects the touch coordinate with respect to only the partial area rather than the whole area of the touch panel 110, thus the sensing data amount which should be read may decrease and the process speed of the touch algorithm may be faster.

The touch sensing system 100 according to an exemplary embodiment described above is described in more detail with reference to FIGS. 2 to 6.

Figure 2A:
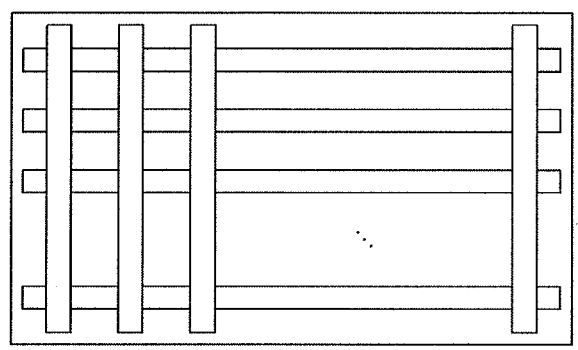
FIGS. 2A and 2B are views illustrating a touch panel in the touch sensing system according to an embodiment of the present invention.
Figure 2B:
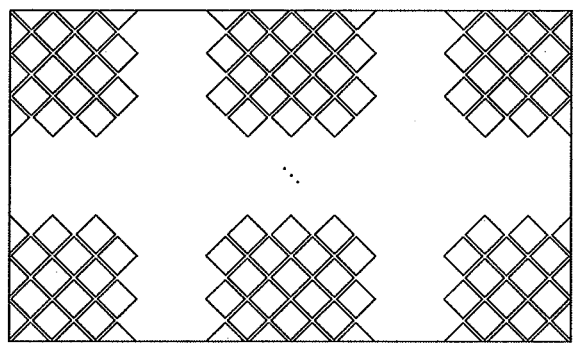

FIGS. 2A and 2B are views illustrating the touch panel 110 in the touch sensing system 100 according to an exemplary embodiment.

As described above, the N number of driving electrodes Tx1 to TxN and the M number of sensing electrodes Rx1 to RxM are formed in the touch panel 110 of the touch sensing system 100 according to an exemplary embodiment.

Here, driving pulses are sequentially provided to the N number of driving electrodes Tx1 to TxN by the two or more touch ICs 120. In addition, in the M number of sensing electrodes Rx1 to RxM, the sensing information of each of the sensor nodes is sensed by the two or more touch ICs 120.

The N number of driving electrodes Tx1 to TxN and the M number of sensing electrodes Rx1 to RxM correspond each other, and thus the N*M number of sensor nodes SN(i,j) (here, $1 \le i \le N$, $1 \le j \le M$, N is the number of the driving electrode, and M is a number of the sensing electrode) are defined. A capacitance is formed in each of the sensor nodes by the driving electrode and the sensing electrode. The capacitance formed in each of the sensor nodes or the capacitance change is measured as the sensing information according to the touch point on the touch panel 110, and thus the touch coordinate and so on are detected.

Here, the N number of driving electrodes Tx1 to TxN and the M number of sensing electrodes Rx1 to RxM may be formed on different layers, and may be formed on the same layer. That is, the touch panel 110 may have a double layer structure (i.e., two layers), or alternatively, the touch panel 110 may have a single layer structure (i.e., one layer).

FIG. 2A is a view illustrating the touch panel 110 having the double layer structure (i.e., two layers), and FIG. 2B is a view illustrating the touch panel 110 having the single layer structure (i.e., one layer).

FIGS. 2A and 2B are views illustrating the electrode structures, and the electrode structure may be designed in various methods in addition to the electrode structures shown in FIGS. 2A and 2B.

Hereinafter, an operation of the touch sensing system 100 is prefiguratively described with reference to FIGS. 3 to 5, by exemplarily showing a case wherein six driving electrodes Tx1, Tx2, . . . , and Tx6 and twelve sensing electrodes Rx1, Rx2, Rx3, . . . , and Rx12 (i.e., N=6 and M=12) are formed in the touch panel 110, and a number of the touch ICs 120 is 4.

Figure 3:
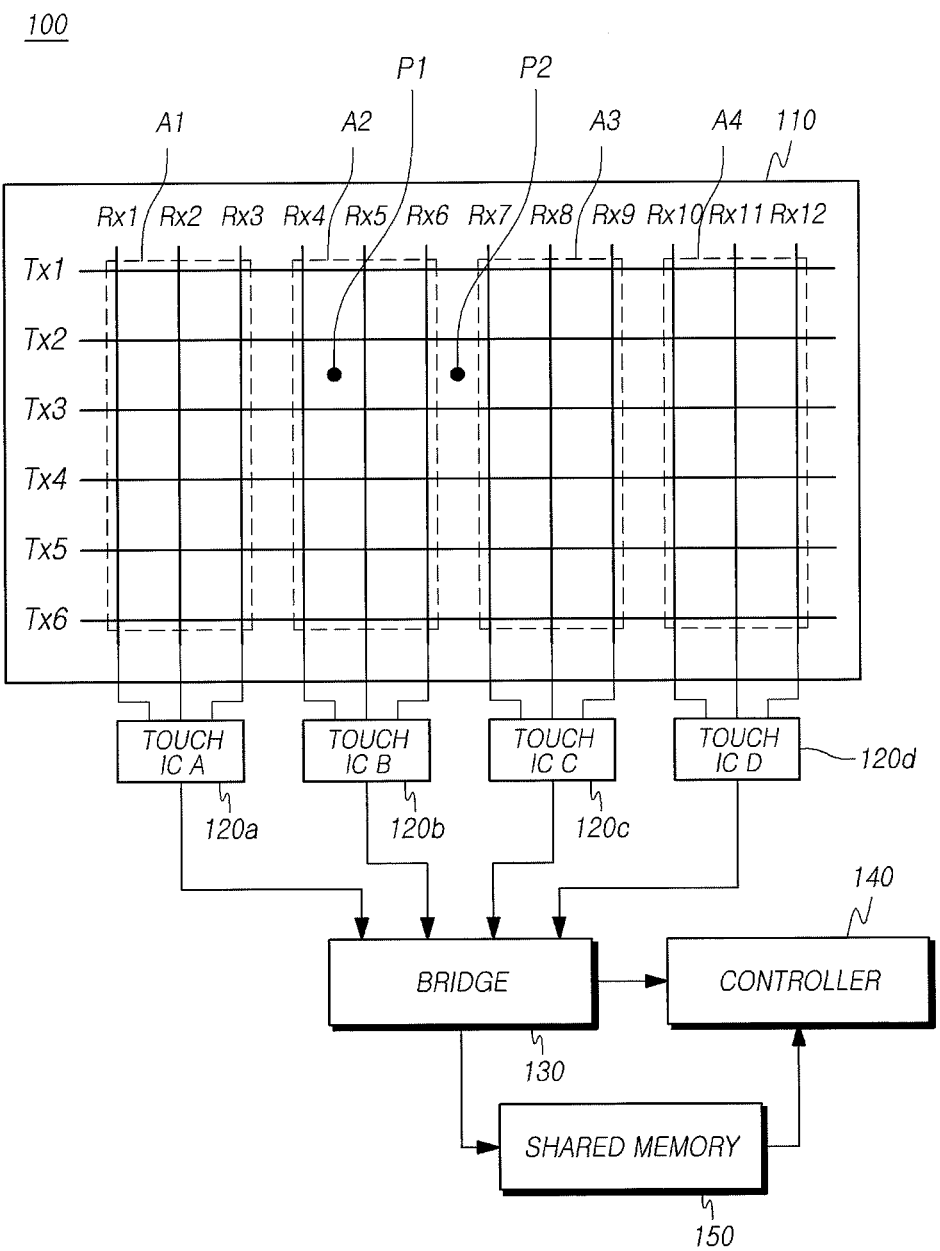
FIG. 3 is a view illustrating the touch sensing system according to an embodiment of the present invention.

FIG. 3 is a view illustrating the touch sensing system according to an exemplary embodiment.

Referring to FIG. 3, the six driving electrodes Tx1, Tx2, . . . , and Tx6 and the twelve sensing electrodes Rx1, Rx2, Rx3, . . . , and Rx12 are formed in the touch panel 110, and thus seventy two sensor nodes SN(i,j) (here, $1 \le i \le 6$, $1 \le j \le 12$) are defined by the correspondence of the six driving electrodes Tx1, Tx2, . . . , and Tx6 and the twelve sensing electrodes Rx1, Rx2, Rx3, . . . , and Rx12. In FIG. 3, crossing points of the six driving electrodes Tx1, Tx2, . . . , and Tx6 and the twelve sensing electrodes Rx1, Rx2, Rx3, . . . , and Rx12 indicate the seventy two sensor nodes.

Each of the four touch ICs 120a, 120b, 120c and 120d manages a separated group of eighteen sensor nodes. That is, the four touch ICs 120a, 120b, 120c and 120d manage the twelve sensing electrodes Rx1, Rx2, Rx3, . . . , Rx12, and each of the four touch ICs 120a, 120b, 120c and 120d manages a separate group of three sensing electrodes.

That is, the touch IC A 120a senses eighteen sensor nodes defined by the correspondence of the six driving electrodes Tx1, Tx2, . . . , Tx6 and the three sensing electrodes Rx1, Rx2 and Rx3. The touch IC B 120b senses eighteen sensor nodes defined by the correspondence of the six driving electrodes Tx1, Tx2, . . . , Tx6 and the three sensing electrodes Rx4, Rx5 and Rx6. The touch IC C 120c senses eighteen sensor nodes defined by the correspondence of the six driving electrodes Tx1, Tx2, . . . , Tx6 and the three sensing electrodes Rx7, Rx8 and Rx9. The touch IC D 120d senses eighteen sensor nodes defined by the correspondence of the six driving electrodes Tx1, Tx2, . . . , Tx6 and the three sensing electrodes Rx10, Rx11 and Rx12.

More specifically, the touch IC A 120a senses sensing information with respect to each of the three sensor nodes SN(1,1), SN(1,2) and SN(1,3), when the driving signal is provided to the driving electrode Tx1. At this time, the touch IC B 120b senses sensing information with respect to each of the three sensor nodes SN(1,4), SN(1,5) and SN(1,6) in the three sensing electrodes Rx4, Rx5 and Rx6, the touch IC C 120c senses sensing information with respect to each of the three sensor nodes SN(1,7), SN(1,8) and SN(1,9) in the three sensing electrodes Rx7, Rx8 and Rx9, and the touch IC D 120*d* senses sensing information with respect to each of the three sensor nodes SN(1,10), SN(1,11) and SN(1,12) in the three sensing electrodes Rx10, Rx11 and Rx12.

Next, the touch IC A 120*a* senses sensing information with respect to each of the three sensor nodes SN(2,1), SN(2,2) and SN(2,3), when the driving signal is provided to the driving electrode Tx2. At this time, the touch IC B 120*b* senses sensing information with respect to each of the three sensor nodes SN(2,4), SN(2,5) and SN(2,6) in the three sensing electrodes Rx4, Rx5 and Rx6, the touch IC C 120*c* senses sensing information with respect to each of the three sensor nodes SN(2,7), SN(2,8) and SN(2,9) in the three sensing electrodes Rx7, Rx8 and Rx9, and the touch IC D 120*d* senses sensing information with respect to each of the three sensor nodes SN(2,10), SN(2,11) and SN(2,12) in the three sensing electrodes Rx10, Rx11 and Rx12.

Thus, as the same manner, each of the touch IC A 120*a*, touch IC B 120*b*, touch IC C 120*c* and touch IC D 120*d* senses all of the sensing information of each of the eighteen sensor nodes managed by each of the touch IC A 120*a*, touch IC B 120*b*, touch IC C 120*c* and touch IC D 120*d*, and transmits the sensing data including the sensing information to the bridge 130.

The bridge 130 receives the sensing data from each of the touch IC A 120*a*, touch IC B 120*b*, touch IC C 120*c* and touch IC D 120*d* in parallel, and thus the bridge 130 receives the sensing information of each of the seventy two sensor nodes.

Next, the bridge 130 aligns and combines (i.e., compose) the sensing data received from each of the touch IC A 120*a*, touch IC B 120*b*, touch IC C 120*c* and touch IC D 120*d*, based on the position of the seventy two sensor nodes.

The aligned and combined sensing data is used when the controller 140 performs the touch algorithm. Thus, the bridge 130 transmits the aligned and combined sensing data.

At this time, the bridge 130 may directly transmit the aligned and combined sensing data to the controller 140. Alternatively, the bridge 130 may store the aligned and combined sensing data in a memory so that the controller 140 reads the aligned and combined sensing data from the memory.

As described above, each of the touch IC A 120*a*, touch IC B 120*b*, touch IC C 120*c* and touch IC D 120*d* senses the information with respect to the eighteen sensor nodes managed by each of the touch IC A 120*a*, touch IC B 120*b*, touch IC C 120*c* and touch IC D 120*d*, and transmits the sensing data including the sensing information to the bridge 130. The bridge 130 aligns the sensing data received from each of the touch IC A 120*a*, touch IC B 120*b*, touch IC C 120*c* and touch IC D 120*d*. The bridge 130 may transmit the aligned sensing data to the controller 140 or may transmit to store the aligned sensing data in the memory.

The sensing data transmitted from each of the touch IC A 120*a*, touch IC B 120*b*, touch IC C 120*c* and touch IC D 120*d* at this time, and the sensing data aligned in the bridge 130 are conceptually shown in FIGS. 4A and 4B.

Meanwhile, referring to FIG. 3, each of the touch IC A 120*a*, touch IC B 120*b*, touch IC C 120*c* and touch IC D 120*d* determines the touch generation or non-generation based on the charge amount change or the voltage change in each of the sensor nodes defined by the connected sensing electrodes among the sensing electrodes formed in the touch panel 110. In addition, each of the touch IC A 120*a*, touch IC B 120*b*, touch IC C 120*c* and touch IC D 120*d* may transmit the touch generation or non-generation information corresponding to the determination result to the bridge 130 along with the sensing data including the sensing information of each of the corresponding sensor nodes.

For example, the touch IC A 120*a* determines whether the touch is generated in an area A1 managed by the touch IC A 120*a*, based on the charge amount change or the voltage change in each of the sensor nodes defined by the sensing electrodes Rx1, Rx2 and Rx3 connected to the touch IC A 120*a* among the sensing electrodes formed in the touch panel 110. The touch IC A 120*a* may transmit the touch generation or non-generation information corresponding to the determination result to the bridge 130 along with the sensing data including the sensing information of each of the corresponding sensor nodes.

The touch IC B 120*b* determines whether the touch is generated in an area A2 managed by the touch IC B 120*b*, based on the charge amount change or the voltage change in each of the sensor nodes defined by the sensing electrodes Rx4, Rx5 and Rx6 connected to the touch IC B 120*b* among the sensing electrodes formed in the touch panel 110. The touch IC B 120*b* may transmit the touch generation or non-generation information corresponding to the determination result to the bridge 130 along with the sensing data including the sensing information of each of the corresponding sensor nodes.

The touch IC C 120*c* determines whether the touch is generated in an area A3 managed by the touch IC C 120*c*, based on the charge amount change or the voltage change in each of the sensor nodes defined by the sensing electrodes Rx7, Rx8 and Rx9 connected to the touch IC C 120*c* among the sensing electrodes formed in the touch panel 110. The touch IC C 120*c* may transmit the touch generation or non-generation information corresponding to the determination result to the bridge 130 along with the sensing data including the sensing information of each of the corresponding sensor nodes.

The touch IC D 120*d* determines whether the touch is generated in an area A4 managed by the touch IC D 120*d*, based on the charge amount change or the voltage change in each of the sensor nodes defined by the sensing electrodes Rx10, Rx11 and Rx12 connected to the touch IC D 120*d* among the sensing electrodes formed in the touch panel 110. The touch IC D 120*d* may transmit the touch generation or non-generation information corresponding to the determination result to the bridge 130 along with the sensing data including the sensing information of each of the corresponding sensor nodes.

Referring to FIG. 3, when the touch is generated in a point P1 of the area A2 managed by the touch IC B 120*b*, the touch generation or non-generation information transmitted from the touch IC A 120*a*, the touch IC C 120*c* and the touch IC D 120*d* may be the touch generation or non-generation information (e.g., 0) instructing the touch non-generation. In contrast, the touch generation or non-generation information transmitted from the touch IC B 120*b* may be the touch generation or non-generation information (e.g., 1) instructing the touch generation.

Meanwhile, referring to FIG. 3, when the touch is generated in a point P2 which is a boundary between two area A2 and A3 managed by the touch IC B 120*b* and the touch IC C 120*c*, the touch generation or non-generation information transmitted from the touch IC A 120*a* and the touch IC D 120*d* may be the touch generation or non-generation information (e.g., 0) instructing the touch non-generation. In contrast, the touch generation or non-generation information transmitted from the touch IC B 120*b* and the touch IC C 120*c* may be the touch generation or non-generation information (e.g., 1) instructing the touch generation.

FIGS. 4A and 4B are views illustrating a sensing data process of the touch sensing system 100 according to an exemplary embodiment. FIG. 4A is a view illustrating the sensing data process with respect to a case (touch generation point=P1) wherein the touch is generated in the point P1 of the area A2 and the point P1 is far away from another area. FIG. 4B is a view illustrating the sensing data process with respect to a case (touch generation point=P2) wherein the touch is generated in the point P2 which is the boundary between the two areas A2 and A3.

Referring to FIG. 4A, the touch IC A 120a senses the sensing information of each of the eighteen sensor nodes SN(i,j) (i=1 to 6, and j=1, 2 and 3) defined by the six driving electrodes Tx1 to Tx6 and the three connected sensing electrodes Rx1, Rx2 and Rx3, and transmits sensing data A 410 including the sensing information to the bridge 130.

In addition, the touch IC A 120a determines whether the touch is generated in the area A1 managed by the touch IC A 120a, based on the charge amount change or the voltage change in each of the sensor nodes defined by the sensing electrodes Rx1, Rx2 and Rx3 connected to the touch IC A 120a among the sensing electrodes formed in the touch panel 110. As the result of the determination, the touch IC A 120a may transmit touch generation or non-generation information 4100 (may be expressed as 0) instructing the touch non-generation to the bridge 130 along with the sensing data 410 including the sensing information of each of the corresponding sensor nodes.

Referring to FIG. 4A, the touch IC B 120b senses the sensing information of each of the eighteen sensor nodes SN(i,j) (i=1 to 6, and j=4, 5 and 6) defined by the six driving electrodes Tx1 to Tx6 and the three connected sensing electrodes Rx4, Rx5 and Rx6, and transmits sensing data B 420 including the sensing information to the bridge 130.

In addition, the touch IC B 120b determines whether the touch is generated in the area A2 managed by the touch IC B 120b, based on the charge amount change or the voltage change in each of the sensor nodes defined by the sensing electrodes Rx4, Rx5 and Rx6 connected to the touch IC B 120b among the sensing electrodes formed in the touch panel 110. As the result of the determination, the touch IC B 120b may transmit touch generation or non-generation information 4200 (may be expressed as 1) instructing the touch generation to the bridge 130 along with the sensing data 420 including the sensing information of each of the corresponding sensor nodes.

Referring to FIG. 4A, the touch IC C 120c senses the sensing information of each of the eighteen sensor nodes SN(i,j) (i=1 to 6, and j=7, 8 and 9) defined by the six driving electrodes Tx1 to Tx6 and the three connected sensing electrodes Rx7, Rx8 and Rx9, and transmits sensing data C 430 including the sensing information to the bridge 130.

In addition, the touch IC C 120c determines whether the touch is generated in the area A3 managed by the touch IC C 120c, based on the charge amount change or the voltage change in each of the sensor nodes defined by the sensing electrodes Rx7, Rx8 and Rx9 connected to the touch IC C 120c among the sensing electrodes formed in the touch panel 110. As the result of the determination, the touch IC C 120c may transmit touch generation or non-generation information 4300 (may be expressed as 0) instructing the touch non-generation to the bridge 130 along with the sensing data 430 including the sensing information of each of the corresponding sensor nodes.

Referring to FIG. 4A, the touch IC D 120d senses the sensing information of each of the eighteen sensor nodes SN(i,j) (i=1 to 6, and j=10, 11 and 12) defined by the six driving electrodes Tx1 to Tx6 and the three connected sensing electrodes Rx10, Rx11 and Rx12, and transmits sensing data D 440 including the sensing information to the bridge 130.

In addition, the touch IC D 120d determines whether the touch is generated in the area A4 managed by the touch IC D 120d, based on the charge amount change or the voltage change in each of the sensor nodes defined by the sensing electrodes Rx10, Rx11 and Rx12 connected to the touch IC D 120d among the sensing electrodes formed in the touch panel 110. As the result of the determination, the touch IC D 120d may transmit touch generation or non-generation information 4400 (may be expressed as 0) instructing the touch non-generation to the bridge 130 along with the sensing data 440 including the sensing information of each of the corresponding sensor nodes.

As described above, when the sensing data 410, 420, 430 and 440 and the touch generation or non-generation information 4100, 4200, 4300 and 4400 are transmitted from each of the touch IC A 120a, touch IC B 120b, touch IC C 120c and touch IC D 120d, the bridge 130 aligns the received sensing data 410, 420, 430 and 440 based on the sensor node position and stores the aligned sensing data 400 to the shared memory 150. At this time, the bridge 130 may directly transmit the aligned sensing data 400 to the controller 140.

In addition, the bridge 130 may provide the touch IC tag 4000 instructing the touch generation or instructing the touch non-generation with respect to each of the touch IC A 120a, touch IC B 120b, touch IC C 120c and touch IC D 120d, by collecting the touch generation or non-generation information 4100, 4200, 4300 and 4400 transmitted from each of the touch IC A 120a, touch IC B 120b, touch IC C 120c and touch IC D 120d.

The above-mentioned touch IC tag 4000 may be data having a type in which the touch generation or non-generation information 4100, 4200, 4300 and 4400 are collected, or may be the touch generation or non-generation information 4100, 4200, 4300 and 4400, as information enabling the controller 140 to check the position where the touch is generated on the touch panel 110.

Meanwhile, the controller 140 reads only the sensing data 420 generated from the touch IC B 120b managing the area (the area A2 in FIG. 3) where the touch is generated among the whole of the sensing data 400 transmitted from the bridge 130 and stored in the shared memory 150, by checking the touch IC tag 4000. The controller 140 may detect the touch coordinate based on the read sensing data 420. Here, reading the portion 420 of the sensing data 400 stored in the shared memory 150, by the controller 140 is referred to as the partial reading. Referring to FIG. 4A, one small block, in the sensing data 410, 420, 430 and 440 transmitted from each of the touch IC A 120a, touch IC B 120b, touch IC C 120c and touch IC D 120d and the sensing data 400 aligned in the bridge 130, indicates sensing information with respect to one sensor node.

Hereinafter, the sensing data process with respect to the case (tough generation point=P2) wherein the touch is generated in the point P2 which is the boundary between the two areas A2 and A3 is described with reference to FIG. 4B.

Referring to FIG. 4B, the touch IC A 120a senses the sensing information of each of the eighteen sensor nodes SN(i,j) (i=1 to 6, and j=1, 2 and 3) defined by the six driving electrodes Tx1 to Tx6 and the three connected sensing electrodes Rx1, Rx2 and Rx3, and transmits the sensing data A 410 including the sensing information to the bridge 130.

In addition, the touch IC A 120*a* determines whether the touch is generated in the area A1 managed by the touch IC A 120*a*, based on the charge amount change or the voltage change in each of the sensor nodes defined by the sensing electrodes Rx1, Rx2 and Rx3 connected to the touch IC A 120*a* among the sensing electrodes formed in the touch panel 110. As the result of the determination, the touch IC A 120*a* may transmit the touch generation or non-generation information 4100 (may be expressed as 0) instructing the touch non-generation to the bridge 130 along with the sensing data 410 including the sensing information of each of the corresponding sensor nodes.

Referring to FIG. 4B, the touch IC B 120*b* senses the sensing information of each of the eighteen sensor nodes SN(i,j) (i=1 to 6, and j=4, 5 and 6) defined by the six driving electrodes Tx1 to Tx6 and the three connected sensing electrodes Rx4, Rx5 and Rx6, and transmits the sensing data B 420 including the sensing information to the bridge 130.

In addition, the touch IC B 120*b* determines whether the touch is generated in the area A2 managed by the touch IC B 120*b*, based on the charge amount change or the voltage change in each of the sensor nodes defined by the sensing electrodes Rx4, Rx5 and Rx6 connected to the touch IC B 120*b* among the sensing electrodes formed in the touch panel 110. As the result of the determination, because the point P2 which is the boundary between the two areas A2 and A3 is the point where the touch is generated, it is determined whether the touch is also generated in the area A2, and thus the touch IC B 120*b* may transmit the touch generation or non-generation information 4200 (may be expressed as 1) instructing the touch generation to the bridge 130 along with the sensing data 420 including the sensing information of each of the corresponding sensor nodes.

Referring to FIG. 4B, the touch IC C 120*c* senses the sensing information of each of the eighteen sensor nodes SN(i,j) (i=1 to 6, and j=7, 8 and 9) defined by the six driving electrodes Tx1 to Tx6 and the three connected sensing electrodes Rx7, Rx8 and Rx9, and transmits sensing data C 430 including the sensing information to the bridge 130.

In addition, the touch IC C 120*c* determines whether the touch is generated in the area A3 managed by the touch IC C 120*c*, based on the charge amount change or the voltage change in each of the sensor nodes defined by the sensing electrodes Rx7, Rx8 and Rx9 connected to the touch IC C 120*c* among the sensing electrodes formed in the touch panel 110. As the result of the determination, because the point P2 which is the boundary between the two areas A2 and A3 is the point where the touch is generated, it is determined that the touch is also generated in the area A3, and thus the touch IC C 120*c* may transmit the touch generation or non-generation information 4300 (may be expressed as 1) instructing the touch generation to the bridge 130 along with the sensing data 430 including the sensing information of each of the corresponding sensor nodes.

Referring to FIG. 4B, the touch IC D 120*d* senses the sensing information of each of the eighteen sensor nodes SN(i,j) (i=1 to 6, and j=10, 11 and 12) defined by the six driving electrodes Tx1 to Tx6 and the three connected sensing electrodes Rx10, Rx11 and Rx12, and transmits the sensing data D 440 including the sensing information to the bridge 130.

In addition, the touch IC D 120*d* determines whether the touch is generated in the area A4 managed by the touch IC D 120*d*, based on the charge amount change or the voltage change in each of the sensor nodes defined by the sensing electrodes Rx10, Rx11 and Rx12 connected to the touch IC D 120*d* among the sensing electrodes formed in the touch panel 110. As the result of the determination, the touch IC D 120*d* may transmit the touch generation or non-generation information 4400 (may be expressed as 0) instructing the touch non-generation to the bridge 130 along with the sensing data 440 including the sensing information of each of the corresponding sensor nodes.

As described above, when the sensing data 410, 420, 430 and 440 and the touch generation or non-generation information 4100, 4200, 4300 and 4400 are transmitted from each of the touch IC A 120*a*, touch IC B 120*b*, touch IC C 120*c* and touch IC D 120*d*, the bridge 130 aligns the received sensing data 410, 420, 430 and 440 based on the sensor node position and stores the aligned sensing data 400 in the shared memory 150. At this time, the bridge 130 may directly transmit the aligned sensing data 400 to the controller 140.

In addition, the bridge 130 may provide the touch IC tag 4000 instructing the touch generation or instructing the touch non-generation with respect to each of the touch IC A 120*a*, touch IC B 120*b*, touch IC C 120*c* and touch IC D 120*d*, by collecting the touch generation or non-generation information 4100, 4200, 4300 and 4400 transmitted from each of the touch IC A 120*a*, touch IC B 120*b*, touch IC C 120*c* and touch IC D 120*d*.

The above-mentioned touch IC tag 4000 may be data having a type in which the touch generation or non-generation information 4100, 4200, 4300 and 4400 are collected, or may be the touch generation or non-generation information 4100, 4200, 4300 and 4400, as the information enabling the controller 140 to check the position where the touch is generated on the touch panel 110.

Meanwhile, the controller 140 reads only the sensing data 420 and 430 generated from the touch IC B 120*b* and the touch IC C 120*c* managing the area (the area A2 and A3 in FIG. 3) where the touch is generated among the whole of the sensing data 400 transmitted from the bridge 130 and stored in the shared memory 150, by checking the touch IC tag 4000. The controller 140 may detect the touch coordinate based on the read sensing data 420 and 430.

Figure 5:
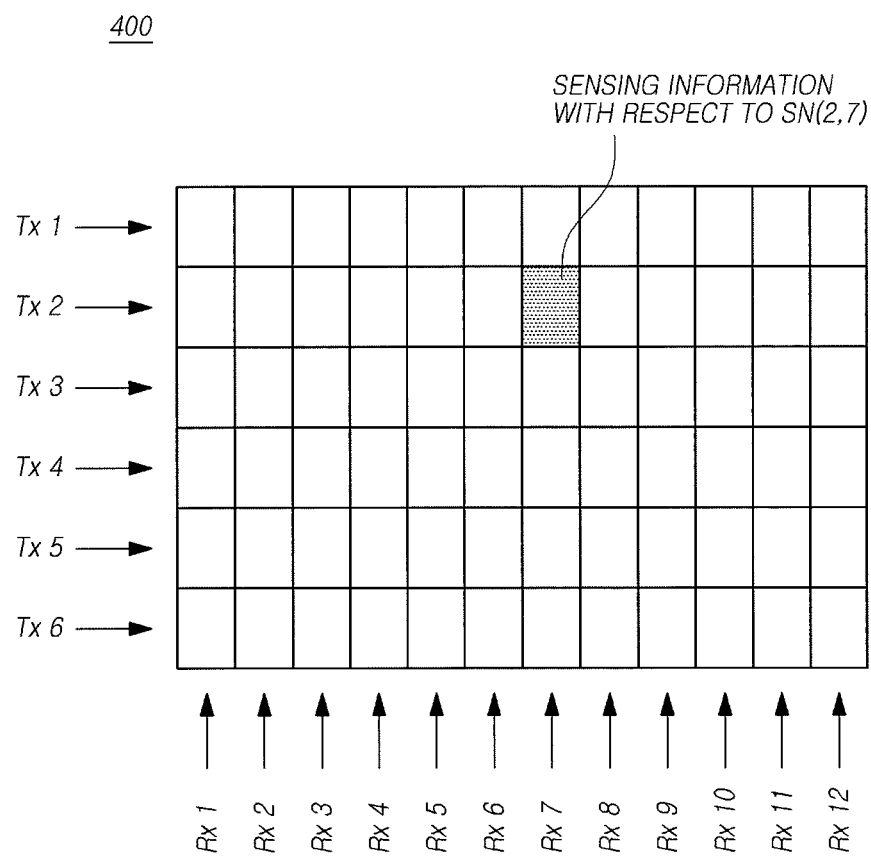
FIG. 5 is a view illustrating sensing data of the touch sensing system according to an embodiment of the present invention.

FIG. 5 is a view illustrating the sensing data 400 aligned in the bridge 130 of the touch sensing system 100 according to an exemplary embodiment.

Referring to FIG. 5, because the bridge 130 receives the sensing data 410 including the sensing information with respect to the eighteen sensor nodes from the touch IC A 120*a*, the sensing data 420 including the sensing information with respect to the eighteen sensor nodes from the touch IC B 120*b*, the sensing data 430 including the sensing information with respect to the eighteen sensor nodes from the touch IC C 120*c* and the sensing data 440 including the sensing information with respect to the eighteen sensor nodes from the touch IC D 120*d* in the parallel communication method, in order to apply the touch algorithm, aligning the received sensing data 410, 420, 430 and 440 in correspondence to the sensor node position is necessary.

Thus, the bridge 130 aligns the sensing data 410, 420, 430 and 440 received from the touch IC A 120*a*, touch IC B 120*b*, touch IC C 120*c* and touch IC D 120*d*, based on the positions of the seventy two sensor nodes SN(i,j) ($1 \leq i \leq 6$, $1 \leq j \leq 12$).

According to such an alignment, as shown in FIG. 5, the position of the sensor nodes in the touch panel 110 and a position of the sensing information in the sensing data are the same.

In the sensing data 400 aligned by the bridge 130 illustrated in FIG. 5, one small block means the sensing data with respect to one sensor node. For example, a small block of a second row and a seventh column is sensing information with respect to a sensor node SN(2,7) defined by a correspondence of a driving electrode Tx2 and a sensing electrode Rx7.

As described above, there is provided a structure in which the bridge 130 is disposed among the two or more touch ICs 120 sensing the sensor nodes in the touch panel 110 and the controller 140 performing the touch algorithm for detecting the touch coordinate and so on. Under such a structure, each of the two or more touch ICs 120 simultaneously transmits the sensing data including the sensing information to the bridge 130 in parallel. That is, each of the two or more touch ICs 120 transmits the sensing data including the sensing information with respect to the corresponding sensor node, without a consideration of the sensing data transmission timing from another touch IC. The bridge 130 aligns misaligned sensing data of each of the sensor nodes. Thus, each of the two or more touch ICs 120 performs the next sensing operation, without needing to wait for transmission of the sensing data from all of the touch ICs 120.

As described above, because the controller 140 may read the sensing data including the sensing information with respect to all of the sensing nodes faster, a faster touch algorithm performance is possible.

Figure 6:
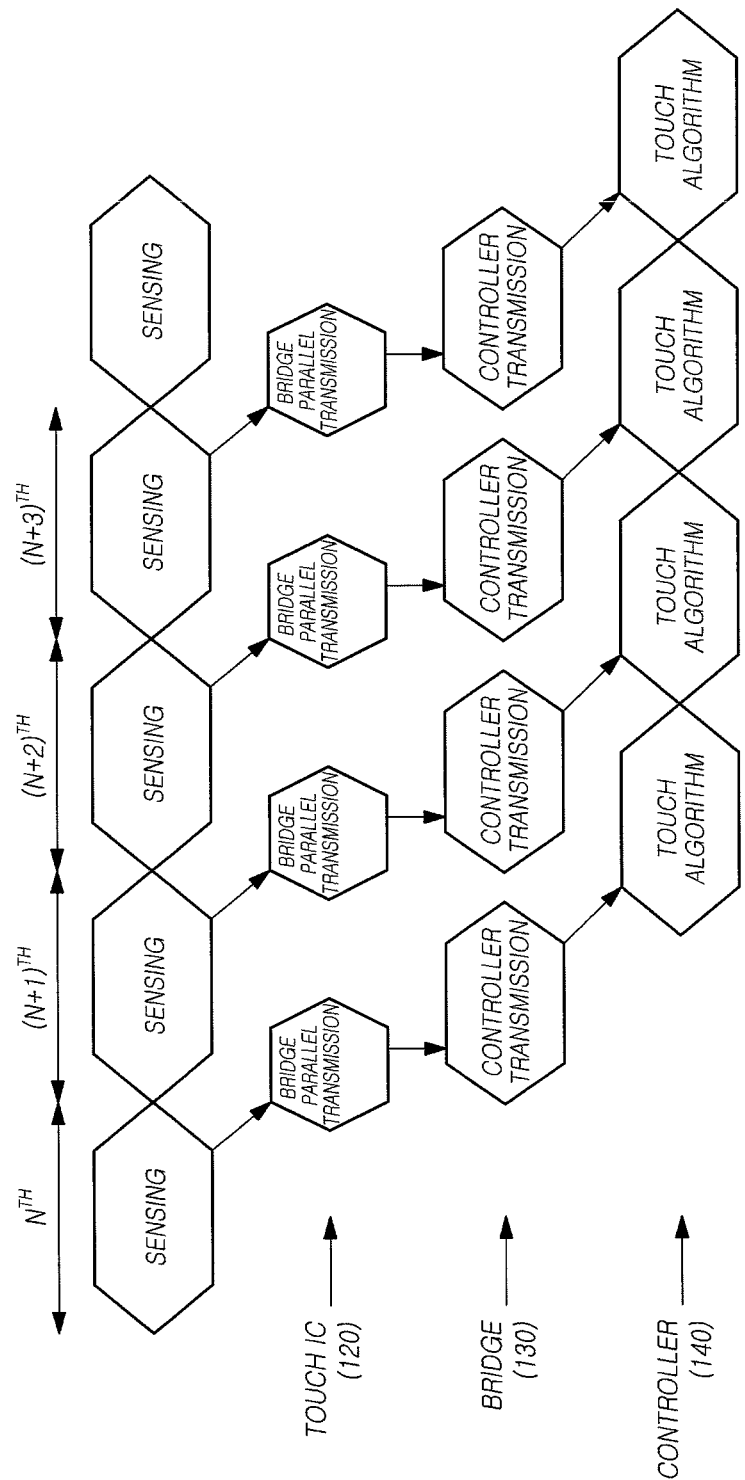
FIG. 6 is a view illustrating a touch sensing process of the touch sensing system according to an embodiment of the present invention.

The touch sensing process of the touch sensing system 100 according to an exemplary embodiment shown in FIG. 6.

FIG. 6 is a view illustrating the touch sensing process of the touch sensing system 100 according to an exemplary embodiment.

When there is no bridge 130, the sensing data should be sequentially transmitted from the two or more touch ICs 120 to the controller 140. In this case, a considerable time delay may be generated in transmitting all of the sensing data from the two or more touch ICs 120 to the controller 140. Therefore, a time for processing a touch sensing increases.

However, according to an exemplary embodiment, as shown in FIG. 6, each of the two or more touch ICs 120 transmits the sensing information to the bridge 130 without consideration of the sensing data transmission timing of another touch IC 120, after each of the two or more touch ICs 120 senses the sensing information with respect to the sensor nodes of each of the two or more touch ICs 120. That is, the bridge 130 simultaneously receives the sensing data from each of the two or more touch ICs 120 in parallel.

Thus, the bridge 130 may receive all of the sensing data in a shorter time in comparison with a case wherein the bridge 130 sequentially receives the sensing data from each of the two or more touch ICs 120.

The bridge 130 again aligns the sensing data received in parallel based on the position of the sensor node and transmits the sensing data. Thus, the bridge 130 enables the controller 140 to perform the touch algorithm in a shorter time.

In addition, referring to FIG. 6, each of the two or more ICs 120 performs a sensing operation for an (N+1)th touch sensing process unrelated to a data transmission (i.e., a bridge parallel transmission) for an Nth touch sensing process.

Meanwhile, as described above, the sensing data aligned in the bridge 130 may be transferred to the controller 140 in the type in which the sensing data directly transferred to the controller 140. Alternatively, the sensing data may be stored in the shared memory to which all of the bridge 130 and the controller 140 access and transferred to the controller 140 in the read type.

A method for transferring the sensing data using the shared memory is described in more detail with reference to FIGS. 7 to 10.

Figure 7:
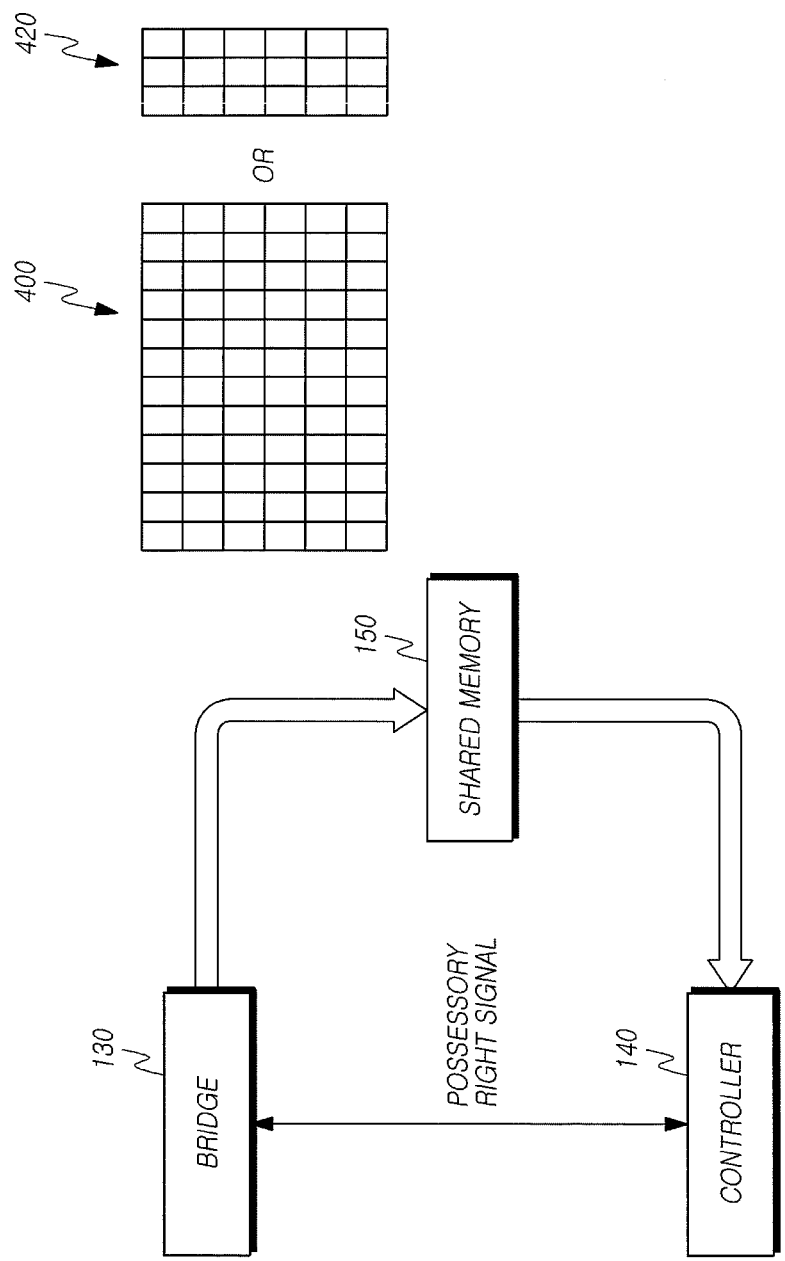
FIG. 7 is a view illustrating a structure of a shared memory in the touch sensing system according to an embodiment of the present invention.

FIG. 7 is a view illustrating a structure of the shared memory in the touch sensing system 100 according to an exemplary embodiment.

Referring to FIG. 7, the touch sensing system 100 according to an exemplary embodiment may further include the shared memory 150 storing the sensing data 400 transmitted from the bridge 130 and read by the controller 140.

The bridge 130 in the touch sensing system 100 according to an exemplary embodiment may be implemented with a Field Programmable Gate Array (FPGA) or may be implemented with a chip made with an Application Specific Integrated Circuit (ASIC) type. Here, the FPGA may be an IC capable of changing a circuit several times and programming the changed circuit again.

The controller 140 in the touch sensing system 100 according to an exemplary embodiment may be a Central Process Unit (CPU) performing the touch algorithm.

As described above, since the bridge 130 and the controller 140 are implemented with separate ICs or chips, each of the bridge 130 and the controller 140 should operate separate memories. In this case, in order to use the sensing data aligned in the bridge 130 in the touch algorithm by the controller 140, procedures of reading, writing and copying the sensing data are frequently generated, in addition to a problem of including the separate memories.

More specifically, the bridge 130 stores the sensing data in a memory 1 (only the bridge 130 may access to the memory 1), when a sensing data is requested from the controller 140 and the sensing data is read from the memory 1 and is transmitted to the controller 140, the controller 140 stores (i.e., copies) the sensing data received from the bridge 130 in a memory (only the controller 140 may access the memory), and the controller 140 should read the sensing data when the controller 140 performs the touch algorithm. Thus, in order to use the sensing data aligned in the bridge 130 in the touch algorithm by the controller 140, the procedures of reading, writing and copying the sensing data are frequently generated, therefore a considerable delay with respect to the touch sensing process is generated.

Thus, the touch sensing system 100 according to an exemplary embodiment further includes the shared memory 150 to which all of the bridge 130 and the controller 140 may access, therefore the procedures of reading, writing and copying the sensing data may be removed or decreased, and thus the faster touch process is possible.

In addition, in the touch sensing system 100 according to an exemplary embodiment, each of the two or more touch ICs 120 determines whether the touch is generated in the areas on the touch panel 110 managed by each of the two or more touch ICs 120 in advance, and informs the result (i.e., touch generation or non-generation determination information). Therefore, the controller 140 may detect the touch coordinate, by using only the sensing data 420 with respect to the partial area, rather than the sensing data with respect to all of the areas on the touch panel 110, based on the touch generation or non-generation determination information 4100, 4200, 4300 and 4400 or the touch IC tag 4000 corresponding to the touch generation or non-generation determination information 4100, 4200, 4300 and 4400. Thus, the sensing data amount which should be read decreases, and there is an effect of increasing a process speed of the touch algorithm by the decrease in the read sensing data amount.

As described above, the bridge 130 and the controller 140 which are two masters use the shared memory 150 which is one slave, therefore a parallel input/output collision may be generated.

Thus, in the touch sensing system 100, the bridge 130 and the controller 140 which are the two masters exchange a possessory right (i.e., an authority) signal accessing to the shared memory 150 to use the shared memory 150 which is the one slave. Therefore, the touch sensing system 100 may control not to generate the parallel input/output collision.

That is, in the touch sensing system 100 according to an exemplary embodiment, the bridge 130 and the controller 140 which are the two masters may exchange the possessory right signal for controlling a possessory right with respect to the shared memory 150.

Here, the possessory right signal is a signal informing which of the bridge 130 and the controller 140 which are the two masters has the possessory right with respect to the shared memory 150, and the possessory right signal is a kind of an interrupt signal.

Meanwhile, the touch sensing system 100 may include a switching element switching a connection to the shared memory 150 from the bridge 130 and the controller 140 so that only one of the bridge 130 and the controller 140 accesses to the shared memory 150 at one time point according to the possessory right signal. The switching element may be included in each of the bridge 130 and the controller 140. Alternatively the switching element may be disposed outside the bridge 130 and the controller 140.

With relation to a method for controlling the possessory right, a bidirectional possessory right signal transmission method, in which each one of the bridge 130 and the controller 140 which are the two masters transmits only own possessory right signal to another of the bridge 130 and the controller 140, may be used. Alternatively, a unidirectional possessory right signal transmission method, in which only one (e.g., the bridge 130) of the bridge 130 and the controller 140 which are the two masters transmits the possessory right signal to another (e.g., the controller 140) of the bridge 130 and the controller 140, may be used.

Hereinafter, the two kinds of methods for controlling the possessory right are described with reference to FIGS. 8 and 9.

Figure 8:
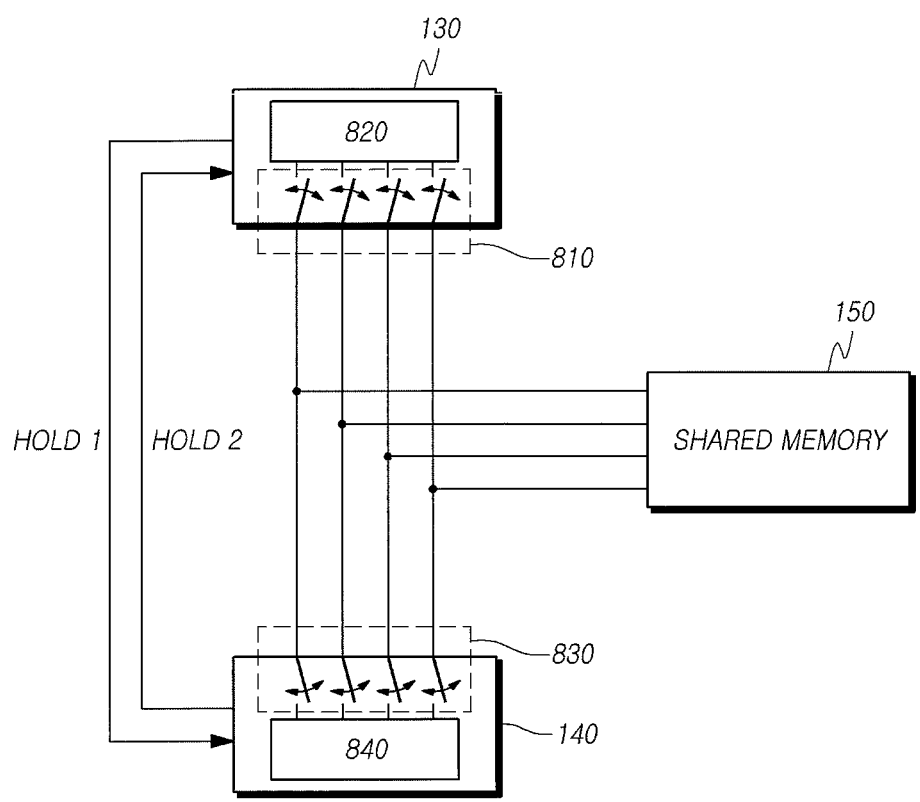
FIGS. 8 and 9 are views illustrating a method for controlling a possessory right with respect to the shared memory of the touch sensing system according to an embodiment of the present invention.

FIG. 8 is a view illustrating the method for controlling the possessory right with respect to the shared memory 150 of the touch sensing system 100 according to an exemplary embodiment.

FIG. 8 is a view illustrating the case wherein the method for controlling the possessory right with respect to the shared memory 150 is the bidirectional possessory right signal transmission method in which each of one of the bridge 130 and the controller 140 which are the two masters transmits the only own possessory right signal to another of the bridge 130 and the controller 140.

In the case of the bidirectional possessory right signal transmission method, each of the bridge 130 and the controller 140 which are the two masters uses the own possessory right signal.

In the case of the bidirectional possessory right signal transmission method, one of the bridge 130 and the controller 140 transmits the own possessory right signal to another of the bridge 130 and the controller 140, and then accesses to the shared memory 150.

For the bidirectional transmission of the possessory right signal, a signal line through which a possessory right signal HOLD1 of the bridge 130 is transferred to the controller 140, and a signal line through which a possessory right signal HOLD2 of the controller 140 is transferred to the bridge 130 may be formed, between the bridge 130 and the controller 140.

In addition, the bridge 130 includes a switching element 810 switching to the shared memory 150 according to whether the bridge 130 possesses the shared memory 150, a processing unit 820 performing a reception, an alignment, a transmission (i.e., a writing) and so on of the sensing data, etc.

The controller 140 includes a switching element 830 switching to the shared memory 150 according to whether the controller 140 possesses the shared memory 150, a processing unit 840 performing a reading (i.e., a reception), the touch algorithm and so on of the sensing data, etc.

The bridge 130 transmits the own possessory right signal HOLD 1 to the controller 140, when there is the sensing data to be written to the shared memory 150.

Thus, the switching element 810 included in the bridge 130 or the outside of the bridge 130 turns on so that the processing unit 820 of the bridge 130 is connected to the shared memory 150. In addition, the switching element 830 included in the controller 140 or the outside of the controller 140 turns off so that the processing unit 840 of the controller 140 is not connected to the shared memory 150.

Thus, only the bridge 130 accesses to the shared memory 150 and uses the shared memory 150. The bridge 130 stores (i.e., writes) the sensing data to the shared memory 150.

On the contrary, the controller 140 transmits the own possessory right signal HOLD2 to the bridge 130, when there is the sensing data (i.e., the whole of the sensing data 400 or the portion of the sensing data 420 stored in the shared memory 150) to be read from the shared memory 150.

Thus, the switching element 830 included in the controller 140 or the outside of the controller 140 turns on so that the processing unit 840 of the controller 140 is connected to the shared memory 150. In addition, the switching element 810 included in the bridge 130 or the outside of the bridge 130 turns off so that the processing unit 820 of the bridge 130 is not connected to the shared memory 150.

Thus, only the controller 140 accesses to the shared memory 150 and uses the shared memory 150. The controller 140 reads the sensing data (i.e., the whole of the sensing data 400 or the portion of the sensing data 420 stored in the shared memory 150) stored in the shared memory 150.

Figure 9:
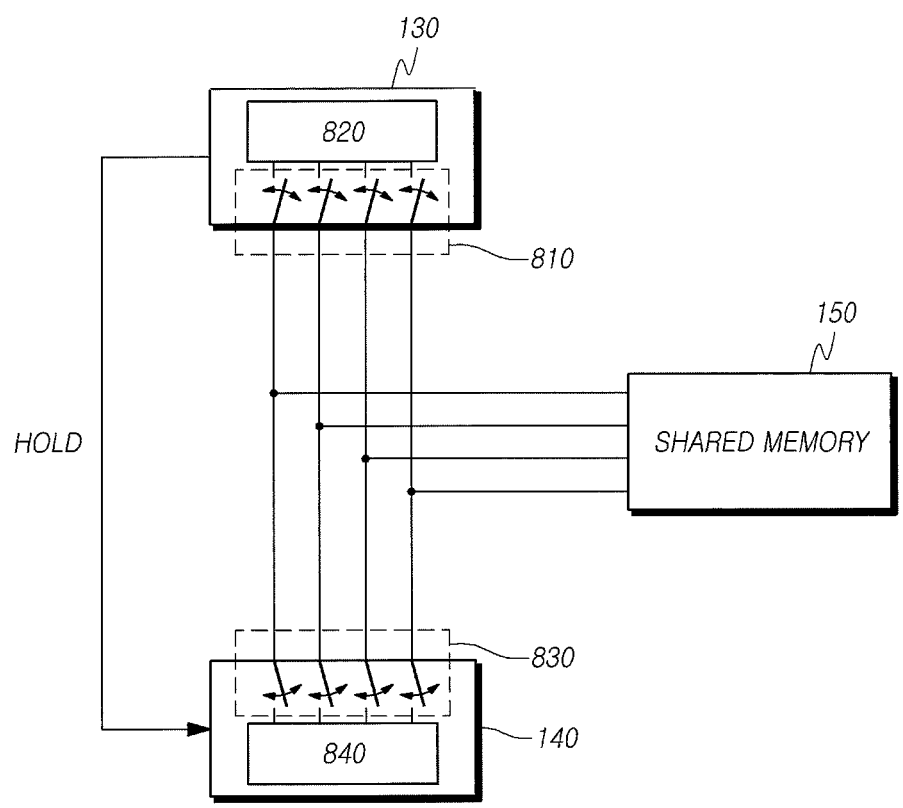

FIG. 9 is a view illustrating another example of the method for controlling the possessory right with respect to the shared memory 150 of the touch sensing system 100 according to an exemplary embodiment.

FIG. 9 is a view illustrating the case wherein the method for controlling the possessory right with respect to the shared memory 150 is the unidirectional possessory right signal transmission method in which only one of the bridge 130 and the controller 140 which are the two masters transmits the possessory right signal to another of the bridge 130 and the controller 140.

In case of the unidirectional possessory right signal transmission method, only one of the bridge 130 and the controller 140 which are the two masters transmits the possessory right signal. For example, the bridge 130 may transmit the possessory right signal, and the controller 140 may only receive the possessory right signal.

In this case, that is, in the case of the unidirectional possessory right signal transmission method, the bridge 130 among the bridge 130 and the controller 140 transmits the possessory right signal to the controller 140, and then the bridge 130 accesses to the shared memory 150. The controller 140 may accesses to the shared memory 150, when the bridge 130 does not transmit the possessory right signal.

For the unidirectional transmission of the possessory right signal, the signal line through which the possessory right signal HOLD is transferred from the bridge 130 to the controller 140, between the bridge 130 and the controller 140.

The bridge 130 includes the switching element 810 switching to the shared memory 150 according to whether the bridge 130 possesses the shared memory 150, the processing unit 820 performing the reception, the alignment, the transmission (i.e., the writing) and so on of the sensing data, etc.

The controller 140 includes the switching element 830 switching to the shared memory 150 according to whether the controller 140 possesses the shared memory 150, the processing unit 840 performing the reading (i.e., the reception), the touch algorithm and so on of the sensing data, etc.

The bridge 130 transmits the possessory right signal HOLD to the controller 140, when there is the sensing data to be writed to the shared memory 150.

Thus, the switching element 810 included in the bridge 130 or the outside of the bridge 130 turns on so that the processing unit 820 of the bridge 130 is connected to the shared memory 150. In addition, the switching element 830 included in the controller 140 or the outside of the controller 140 turns off so that the processing unit 840 of the controller 140 is not connected to the shared memory 150.

Thus, only the bridge 130 accesses to the shared memory 150 and uses the shared memory 150. The bridge 130 accesses to the shared memory to store (i.e., write) the sensing data in the shared memory 150.

On the contrary, the controller 140 may access to the shared memory 150 when the bridge 130 does not transmit the possessory right signal after checking whether the bridge 130 transmits the possessory right signal, when there is the sensing data (i.e., the whole of the sensing data 400 or the portion of the sensing data 420 stored in the shared memory 150) to be read from the shared memory 150.

To this end, the switching element 830 included in the controller 140 or the outside of the controller 140 turns on so that the processing unit 840 of the controller 140 is connected to the shared memory 150. In addition, the switching element 810 included in the bridge 130 or the outside of the bridge 130 turns off so that the processing unit 820 of the bridge 130 is not connected to the shared memory 150. That is, the switching element 810 of the bridge 130 turns on only when the bridge 130 transmits the possessory right signal.

Thus, only the controller 140 accesses to the shared memory 150 and uses the shared memory 150. The controller 140 reads the sensing data (i.e., the whole of the sensing data 400 or the portion of the sensing data 420 stored in the shared memory 150) stored in the shared memory 150.

Meanwhile, the sensing data storing (writing) operation of the bridge 130 is more important than the sensing data reading operation of the controller 140. In addition, a time of the sensing data storing (writing) operation of the bridge 130 is shorter than a time of the sensing data reading operation of the controller 140. Therefore, a priority of the possessory right with respect to the shared memory 150 of the bridge 130 may be higher than a priority of the possessory right with respect to the shared memory 150 of the controller 140.

To this end, in the method for controlling the possessory right using the unidirectional possessory right signal transmission method, only the bridge 130 transmits the possessory right signal having the higher priority of the possessory right with respect to the shared memory 150.

In addition, in the method for controlling the possessory right using the bidirectional possessory right signal transmission method, when the bridge 130 and the controller 140 simultaneously transmit the possessory right signal, the bridge 130 may first possess the shared memory 150 having the higher priority of the possessory right with respect to the shared memory 150. For example, the bridge 130 may directly control the switching element 830 of the controller 140 so that the controller 140 is not connected to the shared memory 150. Alternatively, the bridge 130 may inform the reception of the possessory right signal of the controller 140 to the controller 140 at a point of time when the bridge 130 transmits the own possessory right signal so that the controller 140 is not connected to the shared memory 150 by the switching element 830.

Figure 10:
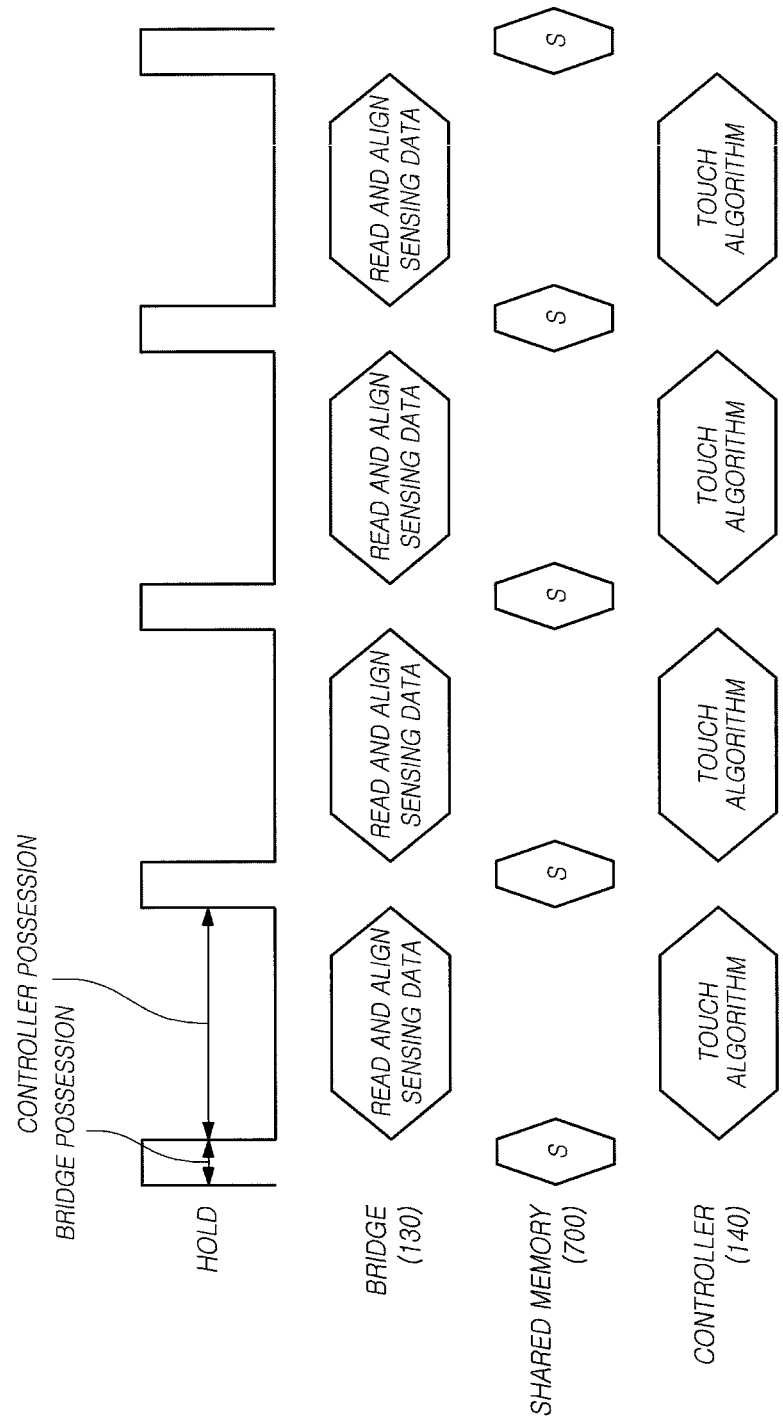
FIG. 10 is a view illustrating a touch sensing process according to a control of the possessory right with respect to the shared memory of the touch sensing system according to an embodiment of the present invention.

FIG. 10 is a view illustrating the touch sensing process according to the control of the possessory right with respect to the shared memory 150 of the touch sensing system 100 according to an exemplary embodiment.

Referring to FIG. 10, a period when the possessory right signal is a high level is a period (i.e., a bridge possession period) when the bridge 130 possesses the shared memory 150. A period when the possessory right signal is a low level is a period (i.e., a controller possession period) when the controller 140 possesses the shared memory 150.

Referring to FIG. 10, the bridge 130 accesses to the shared memory 150 and stores the sensing data during the bridge possession period (this operation is shown as 'S' in FIG. 10).

Referring to FIG. 10, the controller 140 accesses to the shared memory 150, reads the stored sensing data and performs the touch algorithm in the controller possession period.

At this time, for the next sensing process, the bridge 130 reads and aligns the sensing data transmitted from two or more touch ICs 120.

Meanwhile, the two or more touch ICs 120, the bridge 130 and the controller 140 included in the touch sensing system 100 according to an exemplary embodiment, may be formed on a Printed Circuit Board (PCB) attached to the touch panel 110.

Here, the bridge 130 may be implemented with the Field Programmable Gate Array (FPGA) or may be implemented with a chip made with the Application Specific Integrated Circuit (ASIC) type. Here, the FPGA may be the IC capable of changing the circuit several times and programming the changed circuit again.

The bridge 130 may include digital logic units of which a number is identical to a number of the touch ICs 120. Each of the digital logic units may receive the sensing data by a serial communication (e.g., an I2C, an SPI and so on) with the one touch IC 120.

In addition, the controller 140 may be implemented with a Central Process Unit (CPU) and so on performing the touch algorithm, may be a CPU having a type of a DSP, an ARM, a MIPS Core and so on, but is not limited thereto, and the controller 140 may be implemented with any other type.

In addition, the two or more touch ICs 120 may be implemented in an on-chip type. Alternatively, the two or more touch ICs 120 may be implemented in a type in which the two or more touch ICs 120 are divided into a driving unit driving the driving electrodes, a receiving unit receiving the information from the sensing electrodes and a main CPU IC sensing the sensing information (e.g., the capacitance change and so on) of each of the sensor nodes based on the information received from the receiving unit.

Figure 11:
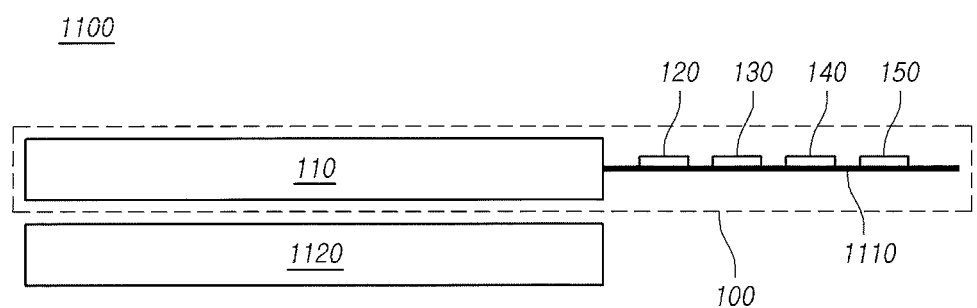
FIG. 11 is a view illustrating a display apparatus according to an embodiment of the present invention.

The touch sensing system 100 according to an exemplary embodiment described above may be included in a display apparatus having a display panel, and such a display apparatus is schematically shown in FIG. 11.

FIG. 11 is a view illustrating a display apparatus 1100 according to an exemplary embodiment.

Referring to FIG. 11, the display apparatus 1100 according to an exemplary embodiment, includes the touch panel 110, a PCB 1110 attached to a side of the touch panel 110, etc. The two or more touch ICs 120 sensing the sensor nodes and transmitting the sensing data, the bridge 130 aligning and transmitting the sensing data transmitted from each of the two or more touch ICs 120 and the controller 140 detecting the touch coordinate based on the sensing data transmitted from the bridge 130 are formed on the PCB 1110.

The PCB 1110 shown in FIG. 11 may be a Flexible Printed Circuit Board (FPCB).

Referring to FIG. 11, the display apparatus according to an exemplary embodiment further includes a display panel 1120, for example, such as a Liquid Crystal Display (LCD) panel, an Organic Light Emitting Diode (OLED) panel and so on.

The touch panel 110 shown in FIG. 11 is also referred to as a Touch Screen Panel (TSP). For example, the touch panel 110 may be attached on the display panel 1120 in an add-on type. Alternatively, the touch panel 110 may be included in the display panel 1120 in an on-cell type or an in-cell type.

Meanwhile, in an exemplary embodiment described above, in order to decrease a sensing time and enable an effective touch sensing process, an additional configuration, referred to as the bridge 130, for aligning and combining the sensing data is disposed between the touch ICs 120 and the controller 140. A high speed of a touch sensing process is possible owing to a determining of the touch generation or non-generation in advance and a following partial reading of the sensing data.

Hereinafter, a touch sensing system according to another exemplary embodiment enabling the high speed of a touch sensing process owing to the determining of the touch generation or non-generation in advance and the following partial reading of the sensing data is schematically described with reference to FIG. 12.

Figure 12:
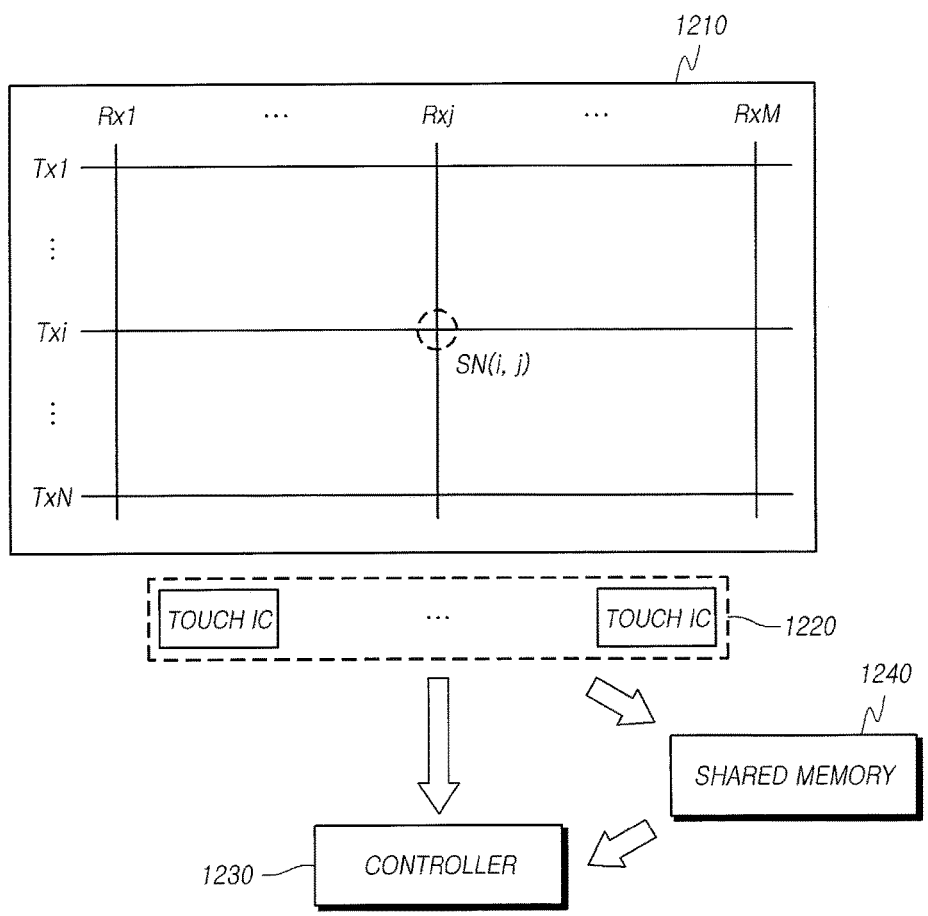
FIG. 12 is a view schematically illustrating a touch sensing system according to another embodiment of the present invention.

The touch sensing system 1200 according to another exemplary embodiment shown in FIG. 12 may include a touch panel 1210 including the driving electrodes Tx1 to TxN and the sensing electrodes Rx1 to RxM defining the sensor nodes, two or more touch ICs 1220 sensing the sensing information of each of the corresponding sensor nodes from the connected sensing electrodes among the sensing electrodes Rx1 to RxM by sequentially driving the driving electrodes Tx1 to TxN, transmitting the sensing data including the sensed sensing information of each of the corresponding sensor nodes, and transmitting the touch generation or non-generation information determined in each of the sensor nodes defined by the connected sensing electrodes or the touch IC tag corresponding to the touch generation or non-generation information, a controller 1230 detecting the touch coordinate based on only the portion of the sensing data among the whole of the sensing data transmitted from each of the two or more touch ICs 1220 and based on the touch generation or non-generation information or the touch IC tags respectively corresponding to the two or more touch ICs 1220, etc.

In addition, referring to FIG. 12, the touch sensing system 1200 according to another exemplary embodiment may further include a shared memory 1240. The shared memory 1240 stores the sensing data transmitted from the two or more touch ICs and the touch generation or non-generation information or the touch IC tag corresponding to the touch generation or non-generation information. The controller 1230 reads only the portion of the sensing data among the whole of the sensing data transmitted from the two or more touch ICs 1220 and stored in the shared memory 1240.

The touch sensing system 1200 according to another exemplary embodiment schematically described with reference to FIG. 12 does not include the bridge 130 according to an exemplary embodiment. Therefore, merely the two or more touch ICs 1220 and/or the controller 1230 share the functions and roles (the alignment and combination of the sensing data) of the bridge 130, and functions, roles and so on of the touch panel 1210, the two or more touch ICs 1220 and the controller 1230 included in the touch sensing system 1200 according to another exemplary embodiment are identical to the functions, roles and so on of the touch panel 110, the two or more touch ICs 120 and the controller 140 included in the touch sensing system 100 according to an exemplary embodiment.

In addition, a display apparatus including the touch sensing system 1200 according to another exemplary embodiment also merely does not include the bridge configuration, and may be implemented identically to the display apparatus 1100 according to an exemplary embodiment shown in FIG. 11.

As described above, according to the present invention, there is the effect of providing the touch sensing system 100 or 1200 decreasing a sensing time and enabling an effective touch sensing, although a number of the sensing electrodes increases according to an increase of an area of the touch panel 110 or 1210, and the display apparatus including the touch sensing system 100 or 1200.

In addition, according to the present invention, there is the effect of providing the touch sensing system 100 or 1200 performing an effective sensing process through the Rx division sensing method partitively sensing the sensing electrodes, when the number of the sensing electrodes increases according to the increase of the area of the touch panel 110 or 1210, and the display apparatus including the touch sensing system 100 or 1200.

With related to the Rx division sensing method, the bridge 130, as the additional configuration receiving the divided and sensed sensing data from the two or more touch ICs 120 in parallel, assigning and combining the received sensing data, among the two or more touch ICs 120 and the controller 140 performing the touch algorithm is further disclosed. Therefore, delays of the sensing data transmission and the touch algorithm performance, rather may be generated by the Rx division sensing method suggested for increasing the effectiveness of the touch sensing when the number of the sensing electrodes increases according to the increase of the area of the touch panel 110, decrease. Thus, there is the effect of enabling high speed of sensing data transmission and touch algorithm performance.

In addition, because of the bridge configuration suggested for the high speed of the data transmission and the touch algorithm, an input/output (I/O) collision may be generated according to memory uses of each of the controller 140 and the bridge 130. In addition, because the number of the sensing electrodes increases due to the increase of the area of the touch panel 110, the sensing data amount stored in the memory and read from the memory increases. Thus, according to the present invention, there is the effect of providing a structure of the shared memory and the method for controlling the shared memory that enables the bridge 130 and the controller 140 to effectively read, write and so on, the sensing data with respect to many sensor nodes without a memory I/O collision.

In addition, according to the present invention, the touch coordinate is detected with respect to the only partial area where it is determined that the touch is generated rather than the whole area on the touch panel 110 or 1210. To this end, only a necessary sensing data is read partially, therefore there is the effect of decreasing the amount of the sensing data which should be read by the controller 140 or 1230 and enabling the controller 140 or 1230 to process the touch algorithm faster.

While the technical spirit of the present invention has been exemplarily described with reference to the accompanying drawings, it will be understood by a person skilled in the art that the present invention may be varied and modified in various forms without departing from the scope of the present invention. Accordingly, the embodiments disclosed in the present invention are merely to not limit but describe the technical spirit of the present invention. Further, the scope of the technical spirit of the present invention is limited by the embodiments. The scope of the present invention shall be construed on the basis of the accompanying claims in such a manner that all of the technical ideas included within the scope equivalent to the claims belong to the present invention.

What is claimed is:

1. A touch sensing system comprising:
    a touch panel including driving electrodes and sensing electrodes defining sensor nodes;
    two or more touch integrated circuits that sense sensing information of each of the corresponding sensor nodes from connected sensing electrodes among the sensing electrodes by sequentially driving the driving electrodes, and transmit sensing data including the sensed sensing information of each of the corresponding sensor nodes,
    wherein the touch integrated circuits determine a touch generation or non-generation in an area formed by the sensor nodes, and transmit touch generation or non-generation information based on the determined touch generation or non-generation;
    a bridge that receives the sensing data and the touch generation or non-generation information from the touch integrated circuits,
    wherein the bridge aligns and combines the sensing data, collects the touch generation or non-generation information, and transmits the sensing data and a touch integrated circuit (IC) tag indicating a touch generation or touch non-generation based on the touch generation or non-generation information;
    a shared memory that stores the sensing data and the touch IC tag transmitted from the bridge; and
    a controller that detects a touch coordinate based on partial reading of the sensing data,
    wherein when the bridge is transmitting a possessory right signal for having a possessory right with respect to the shared memory to the controller, the bridge stores the sensing data and the touch IC tag in the shared memory, and the controller does not read the sensing data from the shared memory, and
    wherein when the bridge is not transmitting the possessory right signal to the controller, the bridge does not store the sensing data in the shared memory, and the controller reads the sensing data and the touch IC tag from the shared memory.

2. The touch sensing system of claim 1, wherein the bridge simultaneously receives, the sensing data transmitted from each of the two or more touch integrated circuits, in parallel.

3. The touch sensing system of claim 1, wherein each of the two or more touch integrated circuits performs a sensing operation for an $(N+1)^{th}$ touch sensing process unrelated to a data transmission for an $N^{th}$ touch sensing process.

4. The touch sensing system of claim 1, wherein the two or more touch integrated circuits determine the touch generation or non-generation in each area formed by the sensor nodes based on a charge amount change or a voltage change, and transmit the touch generation or non-generation information.

5. The touch sensing system of claim 4, wherein the controller reads only a portion of the sensing data corresponding to a high value of the touch IC tag including high and low values.

6. The touch sensing system of claim 1, wherein one of the bridge and the controller accesses to the shared memory after one of the bridge and the controller transmits the possessory right signal to another of the bridge and the controller.

7. The touch sensing system of claim 1, wherein the bridge accesses to the shared memory after the bridge transmits the possessory right signal to the controller, and the controller accesses to the shared memory when the bridge does not transmit the possessory right signal.

8. The touch sensing system of claim 1, further comprising:
    a switching element switching a connection to the shared memory from the bridge and the controller so that only one of the bridge and the controller accesses to the shared memory at one time point according to the possessory right signal,
    wherein the switching element is included in each of the bridge and the controller, or the switching element is disposed outside the bridge and the controller.

9. The touch sensing system of claim 1, wherein a priority of the possessory right signal, of the bridge, for the shared memory is higher than a priority of the possessory right signal, of the controller, for the shared memory.

10. The touch sensing system of claim 1, wherein the controller reads a whole or a portion of the sensing data transmitted from the bridge and stored in the shared memory, and detects the touch coordinate based on the read sensing data, and
    when the controller reads only the portion of the whole of the sensing data transmitted from the bridge and stored in the shared memory, the controller reads only the portion of the sensing data transmitted from the touch integrated circuit to the bridge and stored in the shared memory among the whole of the sensing data stored in the shared memory, based on the touch IC tag stored in the shared memory in correspondence to the two or more touch integrated circuits, respectively, and
    the touch integrated circuit is connected to the sensing electrodes in a partial area corresponding to a point where a touch is generated among a whole area of the touch panel.

11. The touch sensing system of claim 10, wherein the controller, when the point where the touch is generated among the whole area of the touch panel is on a boundary between two areas or is near to an adjacent area in a distance equal to or shorter than a certain distance, reads the portion of the sensing data transmitted from the two touch integrated circuits to the bridge and stored in the shared memory among the whole of the sensing data stored in the shared memory, based on the touch IC tag stored in the shared memory in correspondence to the two or more touch integrated circuits, respectively, and the two touch integrated circuits are connected to the sensing electrodes in each of two areas of both sides of the point where the touch is generated among the whole area of the touch panel or the adjacent area adjacent to the point where the touch is generated among the whole area of the touch panel.

12. The touch sensing system of claim 10, wherein each of the two or more touch integrated circuits determines the touch generation or non-generation based on a charge amount change or a voltage change in each of the sensor nodes defined by the connected sensing electrodes among the sensing electrodes formed in the touch panel, and transmits the touch generation or non-generation information corresponding to the determination result along with sensing data including sensing information of each of the corresponding sensor nodes, the bridge collects the touch generation or non-generation information transmitted from each of the two or more touch integrated circuits, and provides the touch IC tag instructing a touch generation or instructing a touch non-generation to each of the two or more touch integrated circuits, and when the sensing data transmitted from the two or more touch integrated circuits and aligned is stored in the shared memory, the touch IC tags respectively provided to the two or more touch integrated circuits are stored in the shared memory along with the sensing data.

* * * * *